(12) United States Patent  
Tsao

(10) Patent No.: US 6,765,566 B1
(45) Date of Patent: Jul. 20, 2004

(54) METHOD AND APPARATUS FOR DISPLAYING VOLUMETRIC 3D IMAGES

(76) Inventor: Che-Chih Tsao, 16 Walnut St., #43, Arlington, MA (US) 02476

( * ) Notice: Subject to any disclaimer, the term of this patent is extended or adjusted under 35 U.S.C. 154(b) by 0 days.

(21) Appl. No.: 09/218,938

(22) Filed: Dec. 22, 1998

(51) Int. Cl.⁷ .......................... G03B 21/00; G06T 17/00; G06T 15/10; H04N 7/00
(52) U.S. Cl. ........................ 345/419; 345/424; 345/427; 348/36; 348/37; 353/7; 353/5; 353/14
(58) Field of Search ............................... 345/431, 434, 345/5, 7, 72, 74, 418–421, 423–424, 422, 426, 427, 585, 589, 597–600, 84–90; 348/36, 37; 353/7, 10; 359/478, 479, 49; 349/1, 5, 7, 14, 74, 115; 434/262

(56) References Cited

U.S. PATENT DOCUMENTS

| | | | |
|---|---|---|---|
| 3,462,213 A | 8/1969 | De Montebello | 352/86 |
| 4,063,233 A | 12/1977 | Rowe | 340/324 |
| 4,160,973 A | 7/1979 | Berlin | 340/718 |
| 4,881,068 A | 11/1989 | Korevaar et al. | 340/766 |
| 4,922,336 A | 5/1990 | Morton | 358/88 |
| 5,042,909 A | 8/1991 | Garcia | 359/478 |
| 5,148,310 A * | 9/1992 | Batchko | 359/479 |
| 5,161,054 A | 11/1992 | Williams | 359/462 |
| 5,214,419 A * | 5/1993 | DeMond | 340/794 |
| 5,446,567 A * | 8/1995 | Haim | 359/49 |
| 5,506,597 A | 4/1996 | Thompson et al. | 345/85 |
| 5,627,554 A * | 5/1997 | Jefferson | 345/5 |
| 5,668,614 A * | 9/1997 | Chien | 349/115 |
| 5,703,606 A | 12/1997 | Blundell | 345/22 |
| 5,742,331 A * | 4/1998 | Uomori | 345/158 |
| 5,745,197 A * | 4/1998 | Leung et al. | 349/77 |
| 5,754,147 A * | 5/1998 | Tsao et al. | 353/7 |
| 5,764,317 A * | 6/1998 | Sadovnik | 349/5 |
| 5,803,914 A * | 9/1998 | Ryals | 600/407 |
| 5,892,598 A * | 4/1999 | Asakawa | 345/7 |
| 5,954,414 A * | 9/1999 | Tsao | 353/7 |
| 5,982,563 A * | 11/1999 | Nakamura et al. | 359/727 |
| 6,064,423 A * | 5/2000 | Geng | 345/32 |
| 6,097,352 A * | 8/2000 | Zavracky et al. | 345/7 |
| 6,100,862 A * | 8/2000 | Sullivan | 345/88 |
| 6,181,343 B1 * | 1/2001 | Lyons | 345/358 |
| 6,243,055 B1 * | 6/2001 | Fergason | 345/32 |
| 6,302,542 B1 * | 10/2001 | Tsao | 353/7 |
| 6,331,116 B1 * | 12/2001 | Kaufman et al. | 434/262 |
| 6,487,020 B1 * | 11/2002 | Favalora | 359/19 |

* cited by examiner

Primary Examiner—Matthew C. Bella
Assistant Examiner—Wesner Sajous

(57) ABSTRACT

This invention relates generally to new and improved methods and apparatus for displaying volumetric 3D images with colors and for barrier-free interaction with the 3D images. A raw 3D dataset is first processed into a viewable data with a geometry description in the form of a collection of scattered points, curves and surfaces, and a corresponding color description. One of the four color combination methods, exact, spatial, temporal, or spatio-temporal, is the used to process the viewable data into three data subsets, each of a collection of points and of a different color frequency. A set of separate image patterns, each pattern of a different color frequency, is then displayed on a color display system according to the content of the three data subsets. In the final step, the set of separate image patterns is recombined and displayed on a volumetric display device to form color volumetric 3D images.

18 Claims, 13 Drawing Sheets

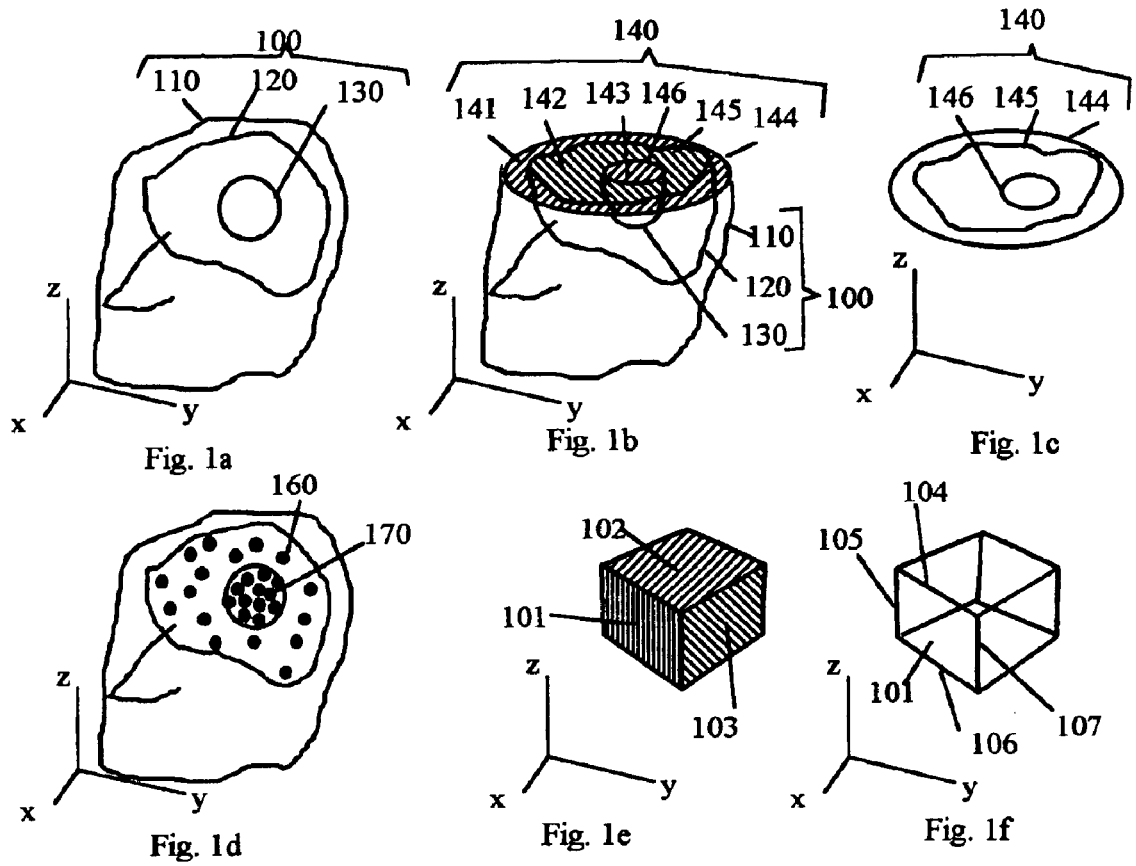
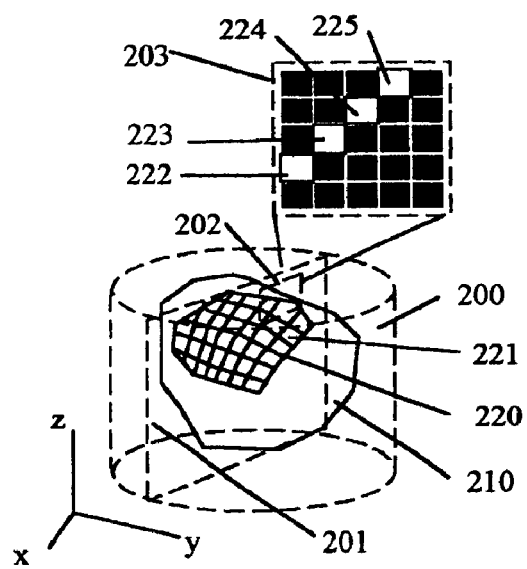

METHOD AND APPARATUS FOR DISPLAYING VOLUMETRIC 3D IMAGES

This invention is related to U.S. Pat. No. 5,754,147 issued May 19, 1998 and U.S. patent application Ser. No. 08/702,047 filed Aug. 23, 1996.

BACKGROUND OF THE INVENTION

A volumetric 3D display displays 3D images in a real 3D space. Each "voxel" in a volumetric image locates actually and physically at the spatial position where it is supposed to be, and light rays travel directly from that position toward omni-directions to form a real image in the eyes of viewers. As a result, a volumetric display possesses all major elements in both physiological and psychological depth cues and allows 360° walk-around viewing by multiple viewers without the need of special glasses.

For convenience of communication in this specification, the term "volumetric 3D image" or "volumetric image" is used to describe a 3D image that actually occupies an actual space (that is, a physical and real space) and has each of its voxels (or volumetric elements forming the image) located physically at a spatial location relative to the physical locations of other voxels. The term "volumetric 3D display" or "volumetric display" is used to represent a display system that is capable of displaying volumetric 3D images. In contrast, a 3D image displayed in perspective views on a conventional CRT monitor, or in a stereoscopic display, do not actually occupy a real space. It is displayed in a virtual space.

There have been two major types of volumetric display using scanning lasers as the image source. The first type projects the scanning laser spots directly on a moving display screen to form images [Garcia, Garcia and Williams, Batchko, Lasher et al., Belfatto]. The second type is based on the principle of two-stage excitation [Korevaar, Downing et al.], which uses the intersection of two laser beams to excite a photoluminescent media to create images. In another approach based on two-stage excitation of a photoluminescent media, two matrices of collimated beams are used to give many intersections in a volume [Thompson]. For displaying color images, the major disadvantage of direct projection of scanning lasers is the limited number of voxels. State of the art laser projection volume display reports 20,000–40,000 voxels per volume [Lasher et al.], which is good for displaying wire-frame images but not enough to render complex color images. In the case of two-stage excitation using solid materials [Downing et al.], the disadvantage is the need of three different materials for the three primary colors. In the case of two-stage excitation using gaseous materials, the main issue may be safety as typical gases used are toxic.

Another approach uses electron beams and phosphor to create images. There are also two types of systems: one uses a moving screen coated with phosphor to receive electron beams emitted from stationary sources[Blundell], and one based on two-stage excitation of a phosphorescent gas [Rowe]. In the rotating screen approach, it would require precise registration of electron beams to phosphors of different colors on a screen which is constantly rotating. As to the two-stage excitation approach by electron beams, it would be difficult to display color images.

Another approach of volumetric display uses a rotating LED (light emitting diode) panel[Berlin]. Optic fibers have also been used to replace LEDs [MacFarlane]. The main issue of this approach is the complexity of assembling the matrix of light sources.

Still another category of volumetric display uses "whole frame display" instead of "point scanning" of lasers or electron beams. One approach uses a stack of electrically switchable liquid crystal display layers[Hattori, Sadovinik]. Another approach uses a piezo-based fast focusing lens to project image frames to a stack of PDLC screens [Paek]. Both approaches have limited resolution because the number of LCD panels or screens in the stack is physically limited. Still another approach projects images composed of collimated light beams directly to a moving screen [Thompson]. A different approach using an optical interfacing mechanism, which smoothly delivers whole frame images created on a stationary projection device onto a moving screen (rotating or reciprocating), allows creation of volumetric 3D images using conventional 2D projection optics, thus removing the requirement of collimated image beams [Tsao et al., Tsao].

To display color 3D volumetric images, approaches based on "whole frame display", especially the one using an optical interfacing mechanism, have the advantages of high voxel number and are capable of applying many techniques used for 2D displays. Based on this approach, this invention is therefore to provide new and improved methods and systems for displaying color volumetric 3D images. This invention is also to improve the interaction between the users and the volumetric display system.

SUMMARY OF THE INVENTION

This invention relates generally to new and improved methods and apparatus for displaying volumetric 3D images with colors or gray scales. The basic concept includes four steps:

1. Process a set of raw 3D data into a viewable data: The viewable data contain a geometry description in the form of a collection of scattered points, curves and surfaces, and a corresponding color description.

2. Process the viewable data into a set of displayable data: One of four color combination methods is the used to process the viewable data into three data subsets, each of a collection of points and of a different color frequency, which can later be combined in a space to form volumetric images with colors. The four color combination methods are: (1) Exact combination: all primary colors in one voxel appears in the same location in the same volume sweep. (2) Spatial combination: primary colors for one voxel appear in slightly different locations but in the same volume sweep. (3) Temporal combination: primary colors for one voxel appear in the same location but in different volume sweeps. (4) Spatio-temporal combination: a combination of (1) and (2).

3. Generate and display a set of separate image patterns on a color display system: A set of separate image patterns, each pattern of a different color frequency, is generated on a color display system according to the content of the displayable data.

4. Recombine and display the set of separate image patterns on a volumetric display system: In the final step, the sets of separate image patterns are recombined and displayed on a volumetric display device to form color volumetric 3D images.

This invention also improves the interaction between the user and the images in the volumetric display by using a concave mirror to project the images in a volumetric display the user's space, and by using a method of virtual manipulating device to extend user's motion into the volumetric display space.

BRIEF DESCRIPTION OF THE DRAWING

The invention can be described in details with the help of the following drawings:

FIGS. 1a–f illustrates examples of the viewable data structure according to the invention;

FIG. 2 illustrates an exemplary Viewable Data of a solid object;

DESCRIPTION OF THE INVENTION

Figure 3:
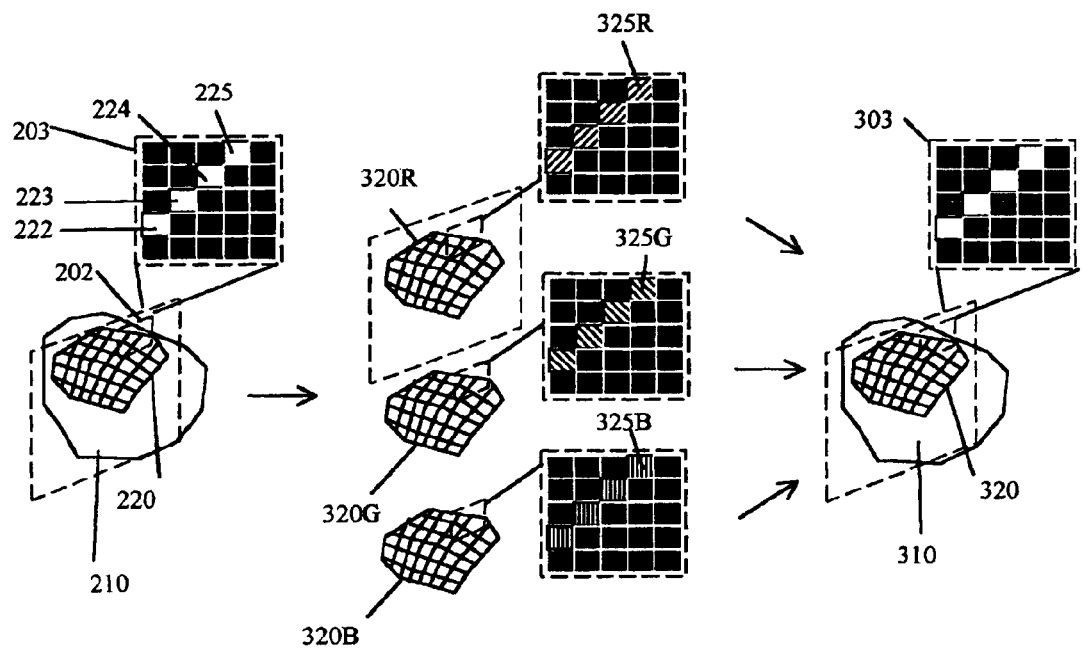
FIG. 3 illustrates the method of exact color combination according to the invention.

The basic concept of the current invention includes four steps:

1. Process a set of raw 3D data into a Viewable Data;
2. Process the Viewable Data into a Displayable Data;
3. Generate and display a set of separate image patterns on a color display system;
4. Recombine and display the set of separate image patterns on a volumetric display system.

Based on our experimental observation, there are three basic geometric forms that viewers are able to clearly perceive their spatial distributions in a 3D real space: scattered points, curves (including lines), and surfaces (including planes).

For example, an X-ray CT (computed tomography) 3D data can be in the form of a collection of densely spaced points, each data point represents an attenuation coefficient of a different value which may represent the density of the tissue and could be transformed into a measure of brightness or gray scale. If all points in the data set are displayed in a real 3D space, it will be difficult for viewers to perceive the density (or brightness) distribution, because the points close to the tissue surface will then block points in the interior, just like one can not see through a tank of muddy water, even if the mud density in the water varies from location to location.

Therefore, in the first step, a raw 3D data has to be converted into a data form, hereby called Viewable Data, of a combination of the three basic geometric forms, which do not have the problem of blocking and confusing the scene. In general, a Viewable Data has a geometry description capable of defining its shape and a color description capable of defining colors of its various portion. The geometry description is in the form of a collection of scattered points, curves, and surfaces.

Back to the example of X-ray CT data, the original data can therefore be represented by a set of boundary surfaces, each boundary surface separating regions of different properties such as densities. Because different tissues usually give different values of attenuation coefficient in medical imaging data, the boundaries of different tissues can therefore be found from the original data. In cases where attenuation coefficient changes without abrupt boundaries, contour boundaries, i.e. boundaries of regions having the same ranges of attenuation coefficient, can be defined. FIG. 1a illustrates the idea with an example, wherein a human head data is represented by three layers of boundary surfaces: the skull 110, the brain 120, and an internal malign tissue 130. In addition, scattered points can be added into the space surrounded by the boundary surfaces to indicate the interior properties, as illustrated in FIG. 1d, at 160 and 170.

In viewing 3D medical data, and many other types of 3D data, sections (cross-sectional images) are very useful. A section is a plane of data and therefore is a Viewable Data. It is further noted that boundary surface or a section can be fully rendered or selectively rendered. When they are fully rendered, they are rendered by dense points, just as bitmap images except they locate in a real 3D space. When they are selectively rendered, they are rendered by scattered points or curves. For example, FIG. 1b illustrates the idea, wherein a section 140 of a human head is superimposed to a boundary surface representation of the head 100. The section is fully rendered so that the bitmap area 142, which is surrounded by curve 145, represents the brain tissue, and similarly the bitmap area 143, surrounded by curve 146, represents the malign tissue. Curve 144, 145, and 146 are the cross-sections of the boundary surfaces 110, 120, and 130 respectively. Alternatively, the section can also be rendered only by those curves, as shown in FIG. 1c 140.

In case the 3D data are solid objects and there is no interest in the interior of the solids, as in the case of a machine assembly, then boundary surfaces are sufficient to represent the solids. FIG. 1(e) illustrates a cube, wherein the three sides of it are represented by three planes 101–103 (the other three sides not shown), each plane being fully rendered as a bit map. No additional data is needed in its interior. Alternatively, the cube can also be represented by a wireframe (lines), as shown in FIG. 1(f), where a plane, e.g. 101, is represented by four lines, 104–107.

In the second step, the Viewable Data is processed into separate data subsets which can later be combined in a space to form volumetric images with colors. Each data subset is composed of a collection of points and has a different color frequency. When these separate subsets are combined in a real space, they form an image with the geometry and the color as defined by the Viewable Data. This new set of data is suitable for the color display devices to display, while the Viewable Data itself is not. The new data set is hereby called Displayable Data.

The formation of the Displayable Data, i.e. how points are distributed to different color frequencies at suitable locations, depends on the method of color combination used to create color images. For convenience of explanation, an exemplary Viewable Data of a solid object is illustrated in FIG. 2. A fully rendered boundary surface 210 represents the object in the display volume 200. A portion of its surface 220 is illustrated with locations of surface points, which also carry color information, for example at 221. Plane 201 represents the location of one projected frame at some instance during a volume sweep, and a small portion of the cross section at that plane 202 is enlarged to show some points of the Viewable Data 203, where four white squares, 222–225, represents four selected points on the boundary surface of the object 210.

There are four basic methods of color combination. The first is "exact combination", which makes all primary colors in one voxel appear in the same location in the same volume sweep. As illustrated in FIG. 3, the Viewable Data 210 is processed into the Displayable Data, which includes three subsets of data 320R, 320G, and 320B, each is of a different primary color, for example, R(red), G(green) or B(blue). Each data point, e.g. 325R, 325G, and 325B, in the subsets locates at the same corresponding position as in the Viewable Data, e.g. 225. As a result, the three subsets can be recombined 310 to the same geometry and color as defined in the Viewable Data 210.

Figure 4:
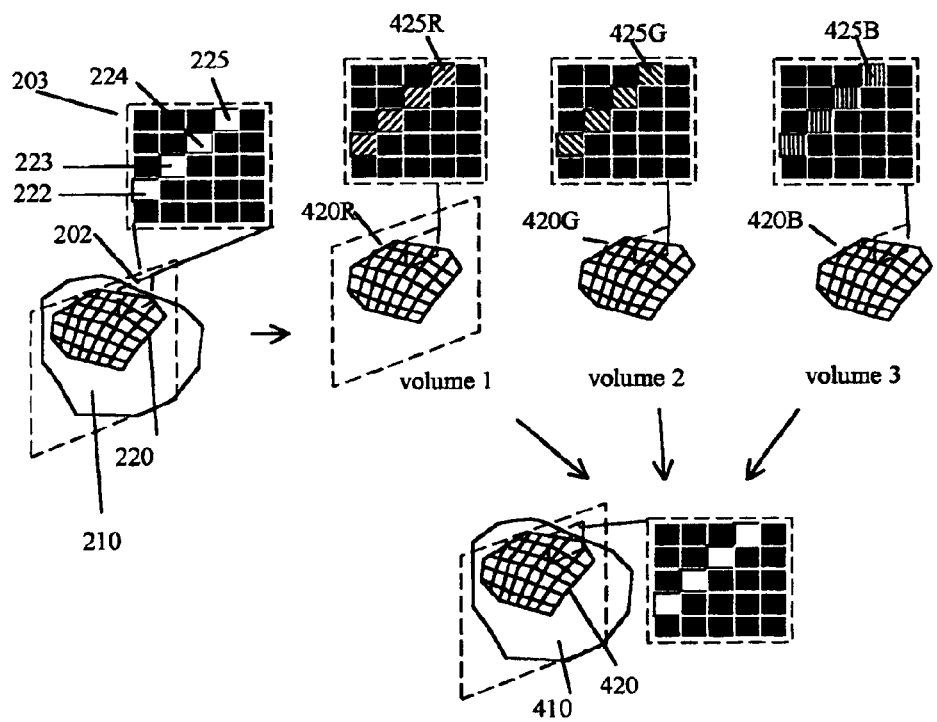
FIG. 4 illustrates the method of temporal color combination according to the invention.

There are occasions where "exact color combination" is economically not desirable. The second method of color combination is "temporal combination", which makes primary colors for one voxel appear in the same location but in different volume sweeps. Based on our experimental observation, a volume refresh rate of 10–15 Hz can generally give good volumetric 3D images. Therefore, if the volume refresh rate is increased to, say, 30–45 Hz, then three data subsets, each carrying a different primary color, can be displayed successively to present a combined color image. As illustrated in FIG. 4, the Viewable Data 210 is processed into the Displayable Data, which includes three subsets of data 420R, 420G, and 420B, each is of a different primary color and is shown in a different but successive volume. Each data point, e.g. 425R, 425G, and 425B, in the subsets locates at the same corresponding position as in the Viewable Data, e.g. 225. As a result, the three subsets can be recombined 410 to the same geometry and color as defined in the Viable Data 210.

Figure 5:
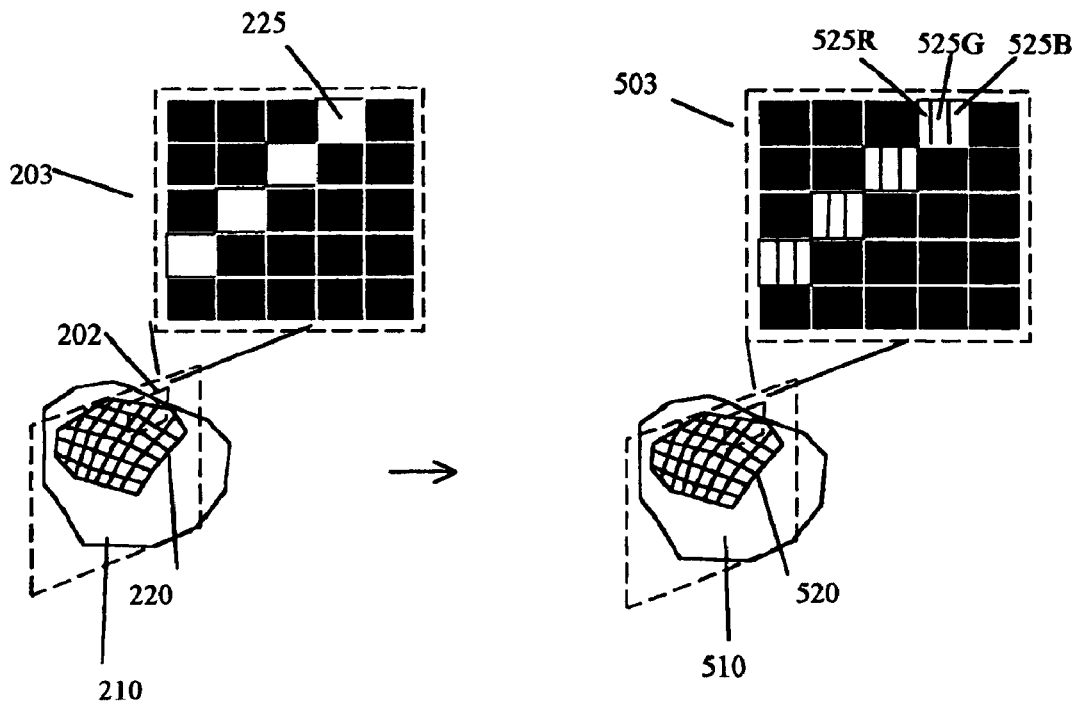
FIG. 5 illustrates the method of spatial color combination by color triads according to the invention.

The third color combination method is "spatial combination", which makes each primary color for one voxel appear in a slightly different location but in the same volume sweep. As illustrated in FIG. 5, each data point, e.g. 225, in the Viewable Data 210 is processed into three slightly offset sub-points, e.g. 525R, 525G, and 525B, of different primary colors. The three closely spaced subpoints appear as one point with the color corresponding to the original data point. In combination, the geometry and color of the Viewable Data can be recreated 510.

Figure 6:
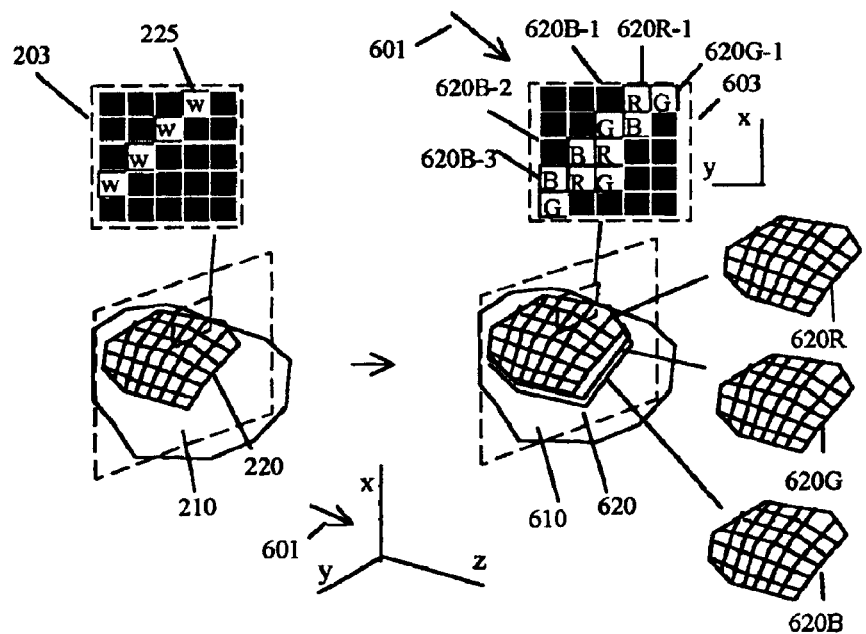
FIG. 6 illustrates the method of spatial color combination by color sub-surfaces according to the invention.

This is similar to the "color triads" technique used in many 2D displays, which uses three sub-pixels of different primary colors to form one pixel. However, in 2D displays the number of sub-pixels for one pixel is limited by their sizes. In volumetric 3D displays, there is additional space to put more sub-voxels to create more color level. It has been pointed out that the volumetric images of 3D objects are mostly composed of boundary surfaces. Therefore, by closely stacking a number of sub-surfaces, each of a different primary color but a similar shape, an integrated surface with a mixture of colors of all individual sub-surfaces can be created. As illustrated in FIG. 6, the surface 220 in the Viewable Data is processed into three sub-surfaces, 620R, 620G, and 620B, each of a different primary color. The three sub-surfaces are closely stacked. As illustrated in an enlarged view 603 of a portion of the integrated surface 620, for example, points with color blue 620B-1, 620B-2, and 620B-3 form part of subsurface 620B. The cases for surfaces 620R and 620G are similar. The mixture of colors of the three sub-surfaces recreates the color of the original data. For example, the combination of points 620R-1(red), 620G-1(green), and 620B-1(blue) appears to be white, as the color of the corresponding point 225 in the original data. It should be noted that the line of sight of a viewer, when viewing the surface 620, is mostly parallel to the xy plane and is therefore mostly perpendicular to the sub-surfaces, as indicated by arrow 601. As a result, the increase of "thickness" of a surface, which is in directions perpendicular to the surface, does not translate to loss of spatial resolution, which is measured in directions parallel to the surfaces. Therefore, each sub-surface can have a "thickness" of several points without affecting the spatial resolution. More points result in more levels of color. This method of "color sub-surfaces" can thus produce more colors for volumetric 3D images than the "color triads" method.

The forth color combination method is "spatio-temporal combination", which is simply a method applying both spatial and temporal color mixing.

In the third step of the current invention, a set of separate image patterns, each of a different primary color, are generated and displayed on a color display system, preferably a projection system, according to the Displayable Data.

Figure 7:
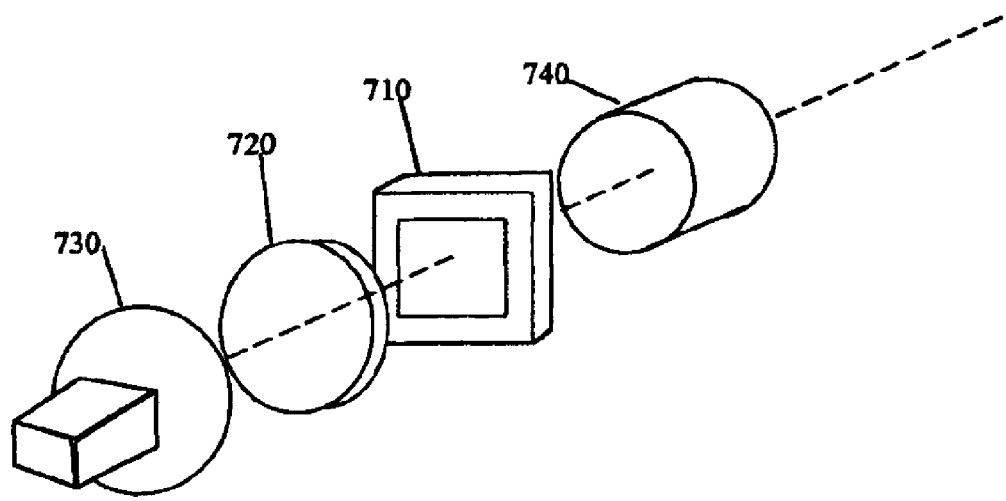
FIG. 7 illustrates the first preferred embodiment of the color image projection system according to the invention.

An ideal image source for the color projection system is a display panel with each of its pixels capable of displaying different colors. Using such a "color-pixel panel" can easily generate volumetric images with colors of "exact combination". In principle, any light emitting, reflecting or transmitting devices that can be tuned, preferably by electricity, to change or select the frequency of light being emitted, reflected or transmitted can be micro-fabricated and integrated to make a "color-pixel panel". One typical example is high speed switchable color filters made of FLC (ferroelectric liquid crystal), which can filter selected frequency spectrum of light through changing combinations of applied voltages[Displaytech]. A "color-pixel panel" can therefore be made with each pixel acting as a switchable color filter independently. FIG. 7 illustrates the first preferred embodiments of the color image projection system. A "color-pixel panel" 710, composed of a matrix of independently controlled FLC switchable color filters 711, is used as the image source. A condenser lens 720 collects the white light from a lamp 730 and illuminates the color display panel. A projection lens 740 projects the image displayed on the color display panel. To create even more color level, more than one "color-pixel panels" can be used. Projected images can be superimposed to create more color levels.

Figure 8:
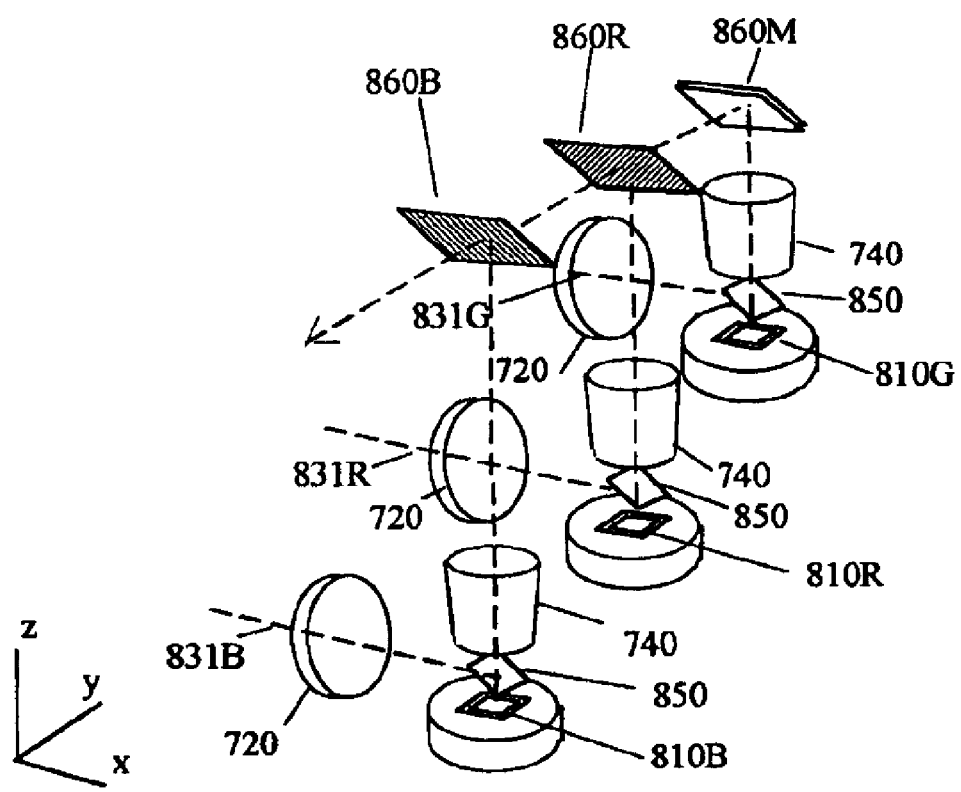
FIG. 8 illustrates the second preferred embodiment of the color image projection system according to the invention.

More commonly, the display panels are monochrome, which require a color illumination to produce color images. FIG. 8 illustrates the second preferred embodiment of the color image projection system, which uses three monochrome display panels, 810R, 810G, and 810B, as the image source. Light beams of three primary colors, 831R–B, illuminate the three panels respectively, through the condenser lens 720. As the display panel depicted here is a reflective panel, a TIR (total internal reflection) prism 850 is used to send the images on the panel to the projection lens 740. If liquid crystal panels are used, polarizers are usually needed, which are not shown in FIG. 8. If the display panel is transmissive, then the optic setup will take the form similar to FIG. 7. The color illumination 831R–B can be generated by using one white light source with a set of dichroic color filters, which is a common practice in optical engineering. To recombine the images on the three panels, a similar dichroic filter system can be used, which include a red reflector 860B, a blue reflector 860G, and a mirror 860M. The OPL (optical path length) from each display panel to the output blue reflector 860B should be kept equal so that the three separate image patterns can be recombined properly.

Figure 9A:
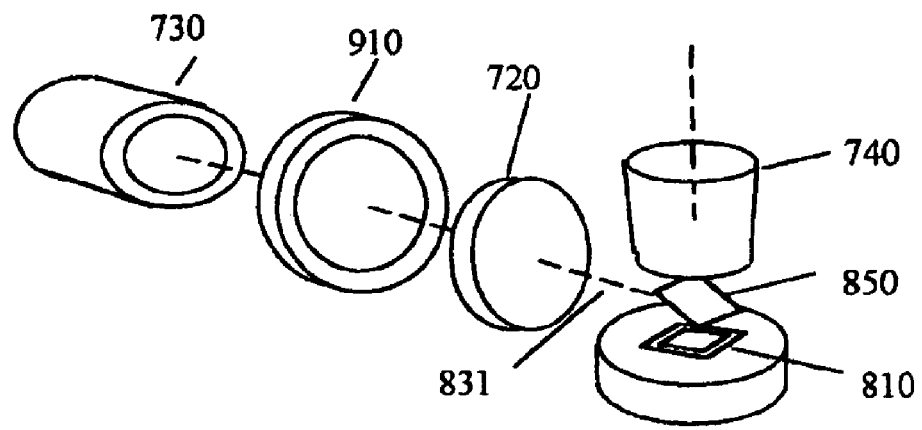
FIG. 9a illustrates the third preferred embodiment of the color image projection system according to the invention.
Figure 9B:
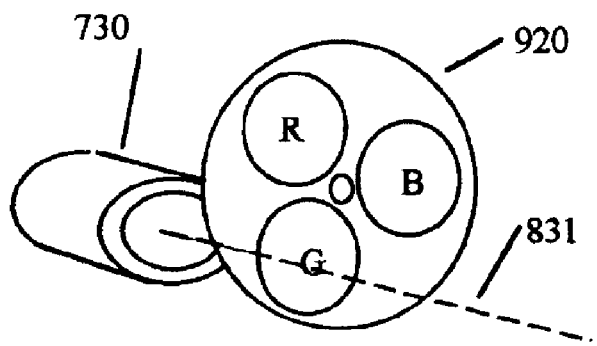
FIG. 9b illustrates the third preferred embodiment of the color image projection system with a rotating color wheel as alternative color switching mechanism.

The third preferred embodiment of the color projection system uses one monochrome display panel with a switchable color illumination system. As shown in FIG. 9a, the monochrome display panel 810 is in the projection optics similar to that in FIG. 8, except that a switchable color filter 910 is used to switch the color of the light beam 831. The switching of the color filter is synchronized to the display panel such that each primary color illuminates the panel when the image pattern corresponding to the same primary color is displayed. Each color switching is also synchronized to every volume refreshing. Color volumetric images can thus be displayed by "temporal combination" method. An alternative color switching mechanism is a rotating color wheel 920, as shown in FIG. 9b.

Figure 10:
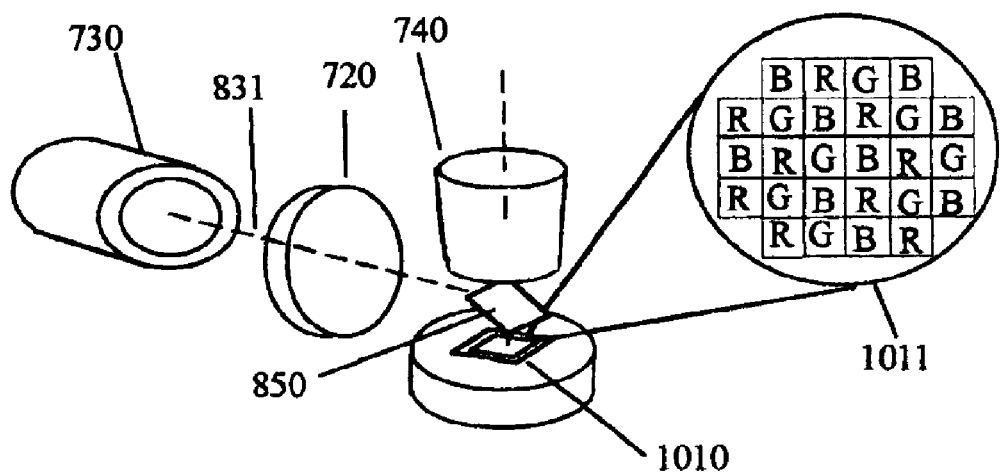
FIG. 10 illustrates the fourth preferred embodiment of the color image projection system according to the invention.

The fourth preferred embodiment of the color projection system uses a display panel with color triads as the image source. As shown in FIG. 10, the display panel 1010 has a mosaic of pixels of three primary colors as illustrated in an enlarged view of the panel 1011. There can be of course various forms of color triads arrangement. The projection optics in this case is again similar to that in FIG. 8. In order to obtain more color levels, three color-triad panels can be used and their image patterns can be superimposed.

Figure 10A:
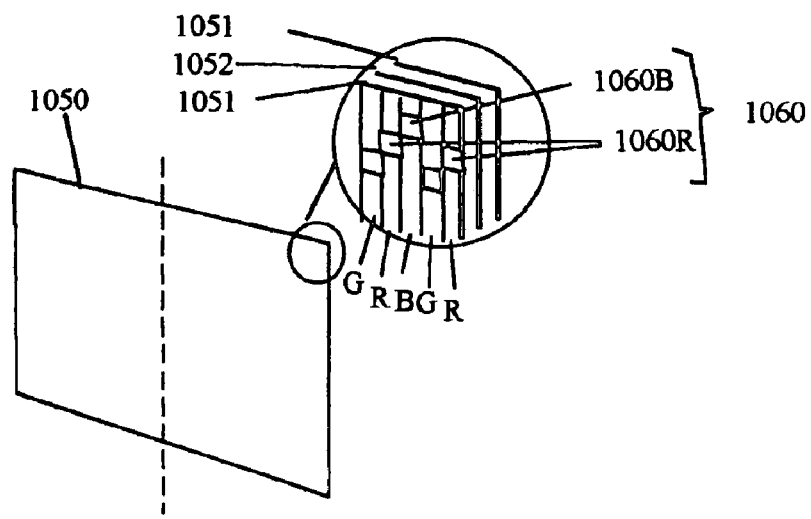
FIG. 10a illustrates an exemplary embodiment of the screen for the apparatus according to the invention.

The fifth preferred embodiment, an alternative color triads approach, is to use a monochrome display panel and a projection screen with color triads coatings. As shown in FIG. 10a, a projection screen 1050 of a volumetric display device is composed of two color filter films or coatings of a color triad format (in stripes as depicted) 1051 sandwiching a translucent and diffusive center material 1052. The image pattern 1060 projected from the monochrome display panel onto the screen are white light points. Points projected onto a red stripe 1060R appear as red points; and points onto blue or green stripes appear as blue or green points, 1060B and 1060G. Alternatively, the color triads on the screen can also be made of a diffusive material with three different colors, coated or printed on a transparent base layer.

Figure 11A:
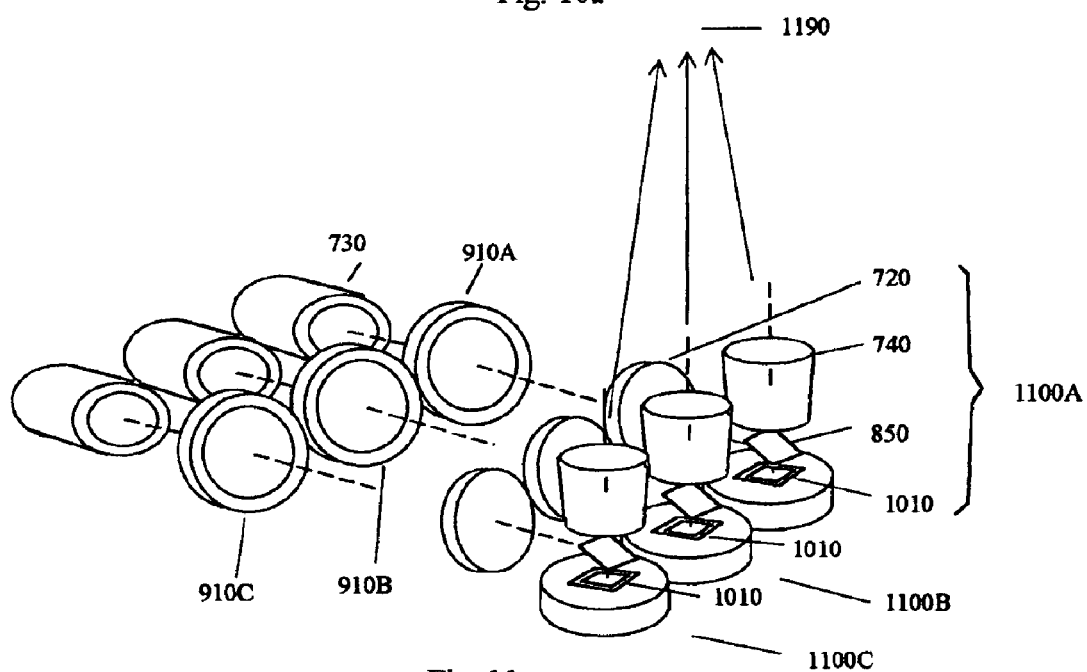
FIG. 11 illustrates the sixth preferred embodiment of the color image projection system according to the invention.

The sixth preferred embodiment of the color projection system uses three display panels with color triads together with a switchable color illumination system as the image source. As shown in FIG. 11a, the system is an assembly of three subsystems 1100A–C, each is essentially the embodiment of FIG. 10, except that a switchable color filter 910A–C is used to control the color of illumination to the display panels. The projected images of the three subsystems coincide at a distance 1190 to create a superimposed frame image.

For volume displays based on whole frame projection, the frame rate of the image panel determines the image resolution in the direction of volume sweeping. The embodiment of FIG. 11a can create color images with a resolution (in the direction of volume sweeping) higher than this limit. The operation concept is explained below. Any one frame of image pattern displayed on the color-triad display panel 1010 contains three subframes: the red pattern, the green pattern, and the blue pattern. Using the switchable color illumination system, these three subframes can be separately and independently projected. For example, a typical switchable FLC color filter has a switch transition time of ~100 micro second (10 K Hz). A typical FLC display panel has a frame rate of 3 K Hz (~3000 frame per second) [Displaytech]. Therefore, a switchable color filter can run one R-G-B cycle within the duration of one frame of the FLC display panel. By using three such subsystems 1100A–C and superimposing each subframe projected from the three subsystems in a manner such that at any moment the superimposed image frame contains three subframes, each from a different display panel and of a different primary color, color volumetric images with a resolution (i.e. total subframe number per volume) three times of that limited by the frame rate of the display panel can be created. A typical projection sequence is as follows:

| Device | panel 1 1100A | filter 1 910A | panel 2 1100B | filter 2 910B | panel 3 1100C | filter 3 910C | color subframes |
|---|---|---|---|---|---|---|---|
| Content/control | frame 1-1 | R | frame 2-1 | G | frame 3-1 | B | f1 |
|  | frame 1-1 | G | frame 2-1 | B | frame 3-1 | R | f2 |
|  | frame 1-1 | B | frame 2-1 | R | frame 3-1 | G | f3 |
|  | frame 1-2 | R | frame 2-2 | G | frame 3-2 | B | f4 |
|  | frame 1-2 | G | frame 2-2 | B | frame 3-2 | R | f5 |
|  | frame 1-2 | B | frame 2-2 | R | frame 3-2 | G | f6 |
|  | . . . |  |  |  |  |  | . . . |

The content of each frame displayed on each display panel should therefore be designed (or programmed) according to the above projection sequence so that the superimposing of the R, G and B subframes from panel 1–3 can create desired color subframes f1, f2 . . . .

Figure 11B:
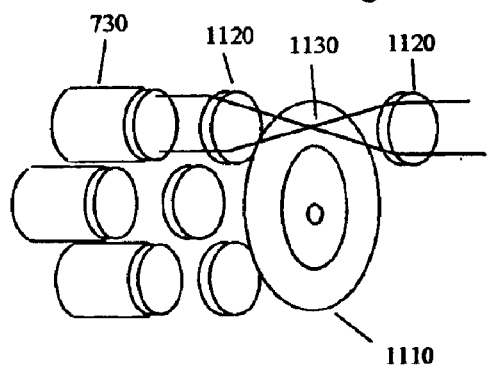
Figure 11C:
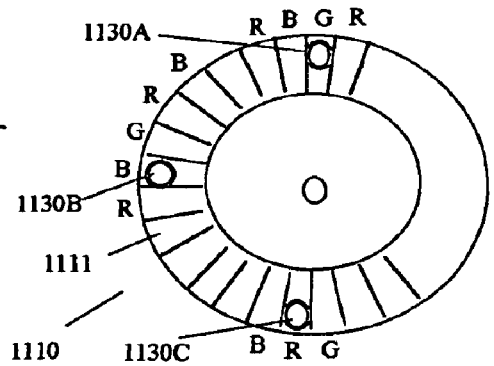

An alternative method to switch color illumination is to use a color wheel. As shown in FIG. 11b, the light beam is converged by a lens 1120 so that it passes the color wheel 1110 at its smallest diameter 1130. The color wheel contains a number of small color filter stripes in an orderly fashion as shown in FIG. 11c. The focused light beams 1130A–C from the three light sources are positioned such that each beam is filtered by a stripe of different color at any instance.

In general, this "subframe method" is used to create color images with higher frame numbers per volume. However, this method is not limited to creating color image. If necessary, more than three subdivisions of a frame can be done by using more than three color filters system to generate even higher resolution in the direction of screen motion. This method is also not limited to display panels of color triads. Any display panel capable of multiple color patterns can be applied, which includes the color-pixel display described in the first embodiment of the color projecting system, as well as film-based displays.

Again, an alternative system to the one of FIG. 11a is to replace the three display panels of color triads 1010 with monochrome display panels and place the color triads on the projection screen.

Figure 12:
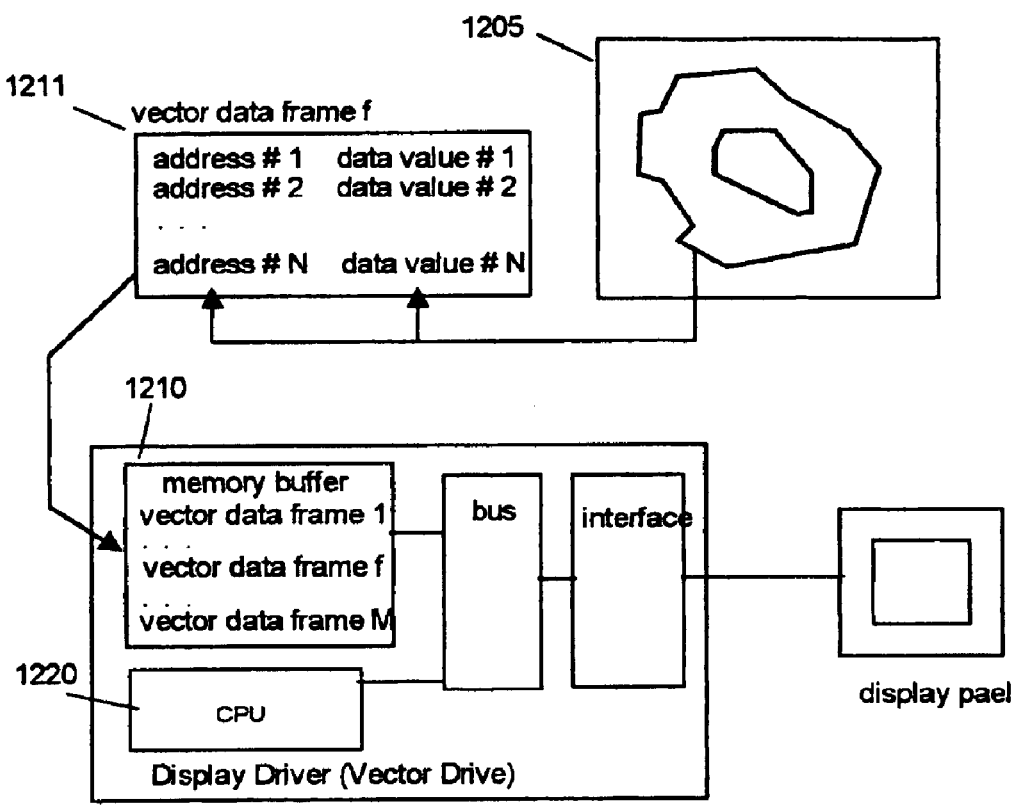
FIG. 12 illustrates the preferred method of driving the display panel according to the invention.

The preferred method of driving the display panels is a "vector driving" method. It has been pointed out in the prior arts [Tsao et al., Tsao] that the image projection device needs to have a high frame rate in order to create satisfactory volumetric 3D images. This means the image data must be uploaded to the display panel at a high speed too. For color display, this speed requirement can be higher since there is now additional data of colors. The mostly adopted driving method for current 2D displays is "rastering", which updates every pixels of the display panel no matter what the content is. In the current invention, one can see that the image data frames to be uploaded to the display panel are mostly in the form of scattered points and curves, as illustrated in FIG. 12 1205, because the 3D Displayable Data are basically in the form of boundary surfaces, curves, and scattered points. That is, a significant portion of the display panel is blank, and only those data points on the boundary curves are effective data. Therefore, if the format of image data storage (frame buffer) and the method of addressing pixels were changed into the "vector" form, instead of the "raster" form, then the requirements on memory buffer size and image data transfer speed for the image driver can be greatly reduced. FIG. 12 illustrates this concept. Under the vector driving method, the frame buffer 1210 no longer stores a full matrix of data entries equal to the pixel numbers of the display. Instead a smaller data array containing addresses and data values (e.g. gray scale number) of only effective pixels (non-blank pixels) is stored 1211. When displaying a frame, the CPU 1220 of the image driver circuit assigns each data value in the array to its corresponding address, i.e. to the corresponding pixel. This is similar to the method of addressing a random access memory (RAM). Many current 2D display devices are actually based on DRAM or SRAM VLSI structure, and therefore can be driven by this vector method.

In the fourth step of the current invention, the sets of separate image patterns are recombined and projected onto a volumetric display device to display the final volumetric 3D color images. The volumetric display systems disclosed in [Tsao et al] and [Tsao] can be used for the current invention, which use an optical interfacing mechanism to deliver whole frame images displayed on a stationary projection device onto a moving screen (either rotating or reciprocating).

Figure 13:
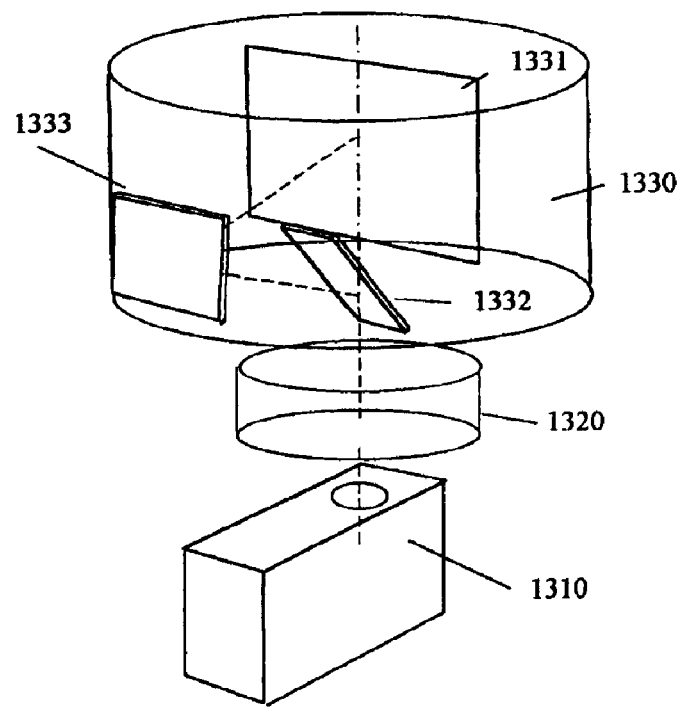
FIG. 13 illustrates the first preferred volumetric display apparatus according to the invention.
Figure 14:
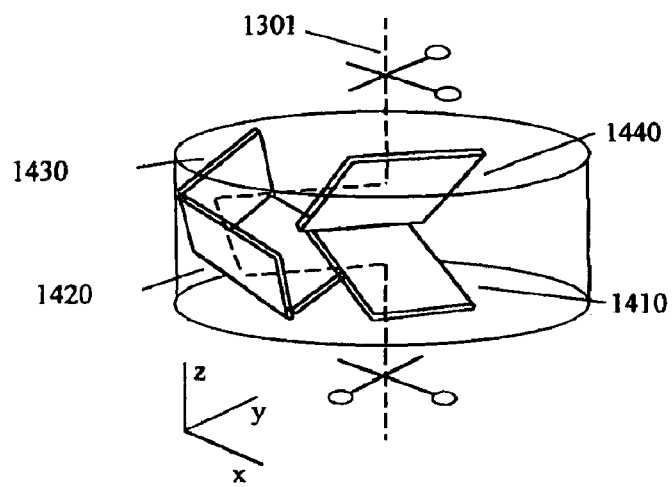
FIG. 14 illustrates a first exemplary embodiment of the optical interfacing mechanism for the apparatus of FIG. 13.

One of the rotating screen system, as illustrated in FIG. 13, features three major portions: a rotating screen unit 1330 (including a screen 1331, a central reflector 1332, and a side reflector 1333); a high frame rate image projection system 1310; and a optical interfacing mechanism 1320, which relays the optical image projected from the image projector onto the screen for displaying, while keeping the size, orientation and focus of the projected image invariant as the screen rotates. The preferred optical interfacing mechanism is an optical image rotator rotating at half the speed of the screen. Besides the preferred interfacing mechanisms disclosed in [Tsao et al] and [Tsao and Chen], there are several other image rotators that can be used, including image rotating prisms such as Dove prism (or K-mirror) and Pechan prism. However, these prisms have a long internal optical path length, which is not advantageous for projection optics. One preferred optical interfacing mechanism is based on a 90° reflector, which is capable of flipping an image and therefore can be used as an image rotator. As illustrated in FIG. 14, reflector 1410 takes a light beam coming along the rotating axis and sends it to the 90° reflector 1420, which flips the image; reflector 1430 and 1440 return the beam back to the rotating axis 1301. As shown in FIG. 14, the 90 degree reflector comprises two flat reflectors arranged at an angle of 90 degree with each other. As the whole reflector assembly rotates, the output image will rotates at twice the speed of the reflector assembly. In the preferred system, a configuration consisting of two sets of the 4-reflector setup arranged in symmetry is used. This arrangement reduces reflector sizes and shortens off-axis optical path length. Front surface mirrors, instead of prisms, are used to reduce weight.

Figure 15:
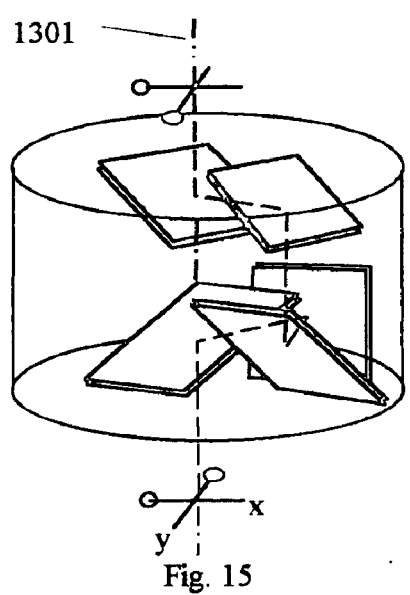
FIG. 15 illustrates a second exemplary embodiment of the optical interfacing mechanism for the apparatus of FIG. 13.

Another preferred optical interfacing mechanism consists of 5 mirrors in a different setup, as shown in FIG. 15. The 5-mirror system inverts the image such that as the whole mechanism rotates, the projected image frame rotates at twice the speed. This system can also be made into a 10-reflector assembly consisting of two 5-mirror system arranged in symmetry, to reduce reflector size and shorten off-axis optical path length.

Figure 16:
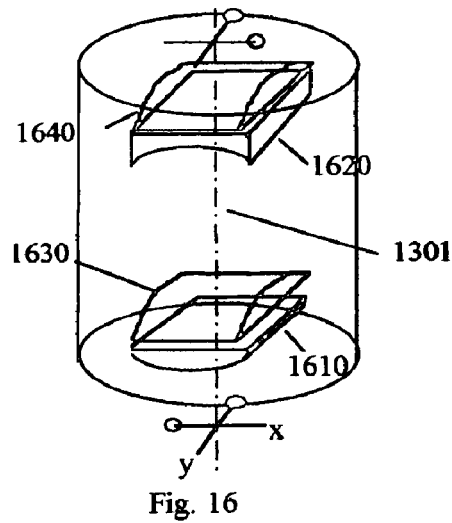
FIG. 16 illustrates a third exemplary embodiment of the optical interfacing mechanism for the apparatus of FIG. 13.

Still another preferred optical interfacing mechanism consists of two pairs of cylindrical projection lens, with their power meridians set in orthogonal directions, as shown in FIG. 16. The powers of the lens are selected such that the projected image is inverted in x direction, by lens 1610 and 1620, and is erect in y direction, by lens 1630 and 1640, but the image locations and the magnifications are the same. This is possible because cylindrical lens work only in the directions of the power meridians. The optics thus invert the image such that as the whole mechanism rotates, the projected image frame rotates at twice the speed. In this mechanism, image rotation and image projection are combined.

Figure 17:
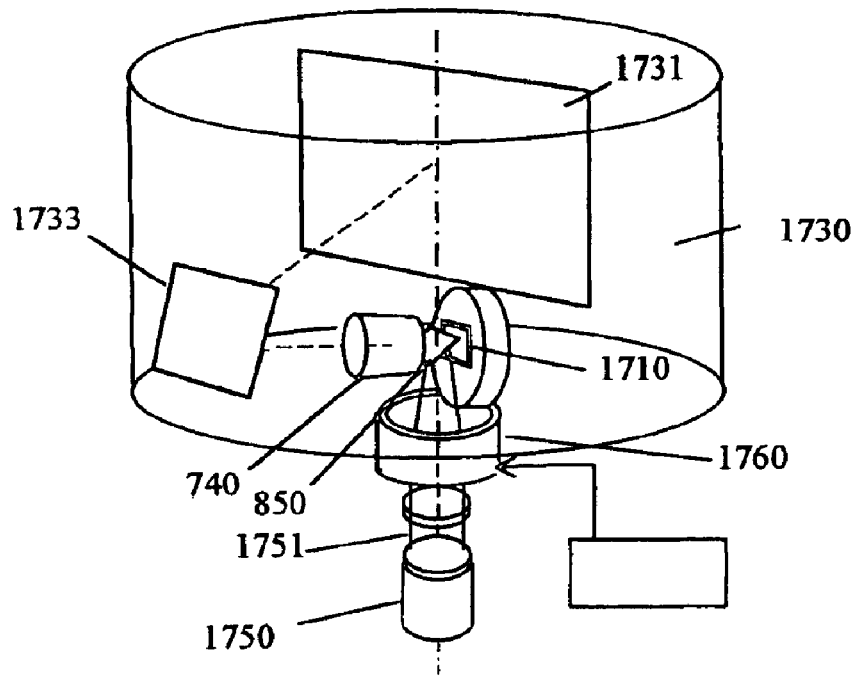
FIG. 17 illustrates the second preferred volumetric display apparatus according to the invention.

FIG. 17 illustrates another preferred embodiment of the volumetric display system. This system places the display panel 1710 and the projection optics all on the rotating unit 1730 where the screen 1731 and side reflector 1733 sit. Because the projection system rotates with the screen, there is no need of the optical interfacing system. The light source 1750 does not need to rotate. The light beam 1751 can travel along the rotation axis to reach the display panel. A slip ring system 1760, or the like, is needed in order for sending data into the rotating unit. Depending on the method of color combination used, switchable light shutters or color filters may be placed on the rotating unit or out side of it with the stationary light source. This system works best when the display panel and the projection optics are of small dimension and lightweight.

Figure 18:
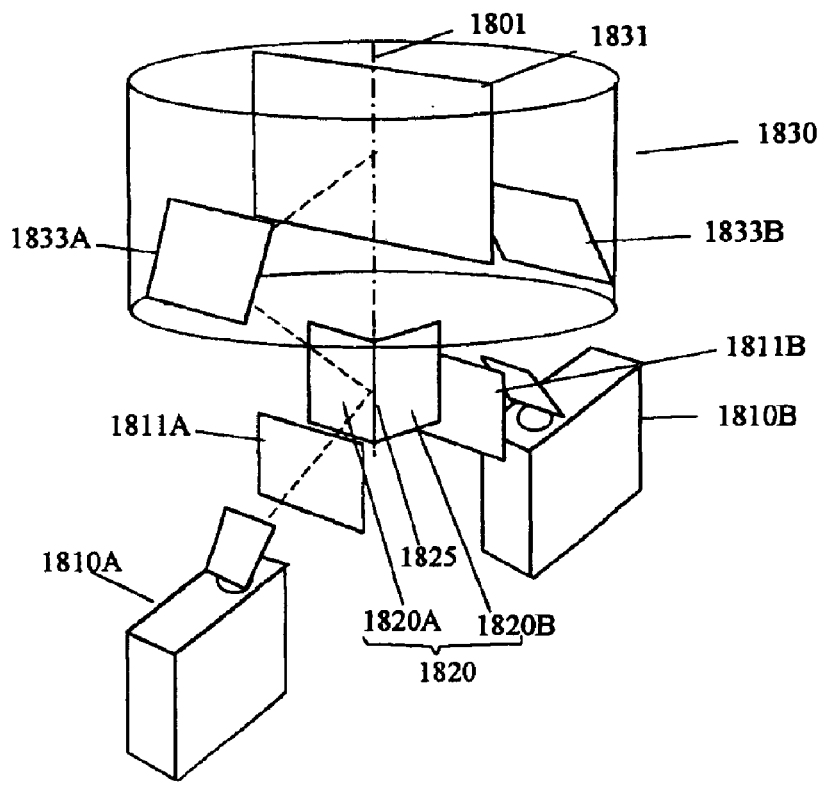
FIG. 18 illustrates the third preferred volumetric display apparatus according to the invention.

[Tsao et al.] disclosed a volumetric display system using a single reflector as the interfacing mechanism. That system can be modified by using a pair of orthogonal reflectors as the interfacing mechanism. As shown in FIG. 18, the two reflectors 1820 are mounted at an angle of 900, and revolves around a common axis 1801 passing through the roof edge 1825 where the two reflectors contact. The reflection surface is on the convex sides 1820A & B. The translucent screen 1831 and two side reflectors 1833A & B, in opposite positions, also revolve around the common axis, at a speed twice that of the orthogonal reflectors. Two image projection systems 1810A & B at opposite sides of the orthogonal reflectors are used. From one screen revolution to the next, the two projection systems take turns projecting image frame to the screen through the orthogonal reflectors. Within each screen revolution, which has two volume sweeps, one reflector and one side reflector (e.g. 1820A and 1833A) relay the projected image frame onto one side of the screen during the first volume, the other reflector and the other side reflector (e.g. 1820B and 1833B) relay the projected frames to the other side of the screen during the second volume sweep. Two light shutters 1811A & B are used to regulate the projection beam from the image projection systems to make sure the projection beam reaches the correct reflector. The light shutter has two independent shutter areas, as disclosed in [Tsao].

Figure 19:
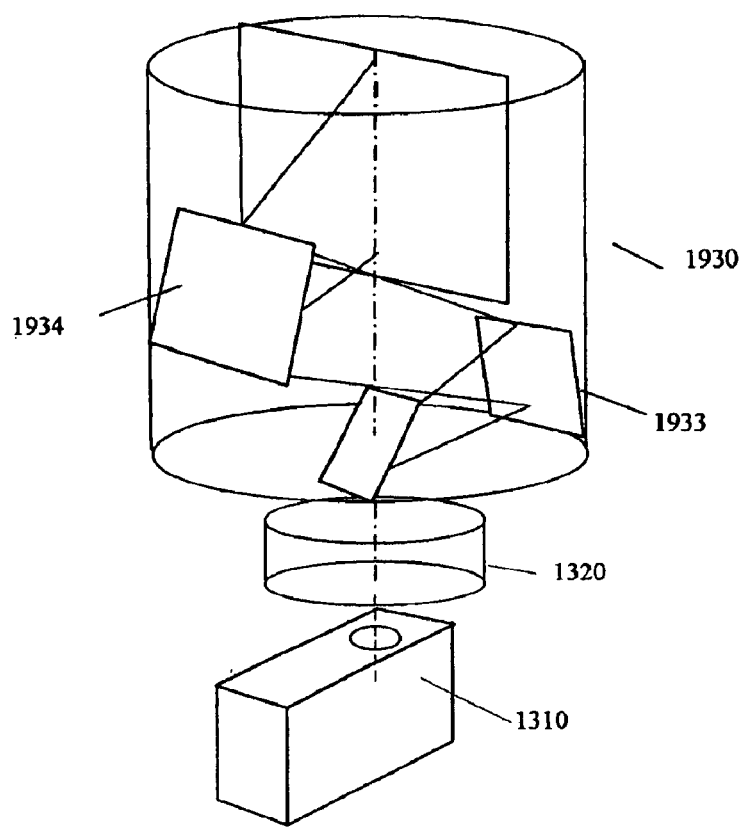
FIG. 19 illustrates an exemplary embodiment of the rotating screen setup for the volumetric display apparatus according to the invention.

FIG. 19 is a preferred embodiment of the rotating screen unit using more than one side reflectors, e.g.1933 and 1934, to accommodate the increase of screen size (i.e. the display volume) without increasing the diameter of the rotating unit 1930.

Figure 20:
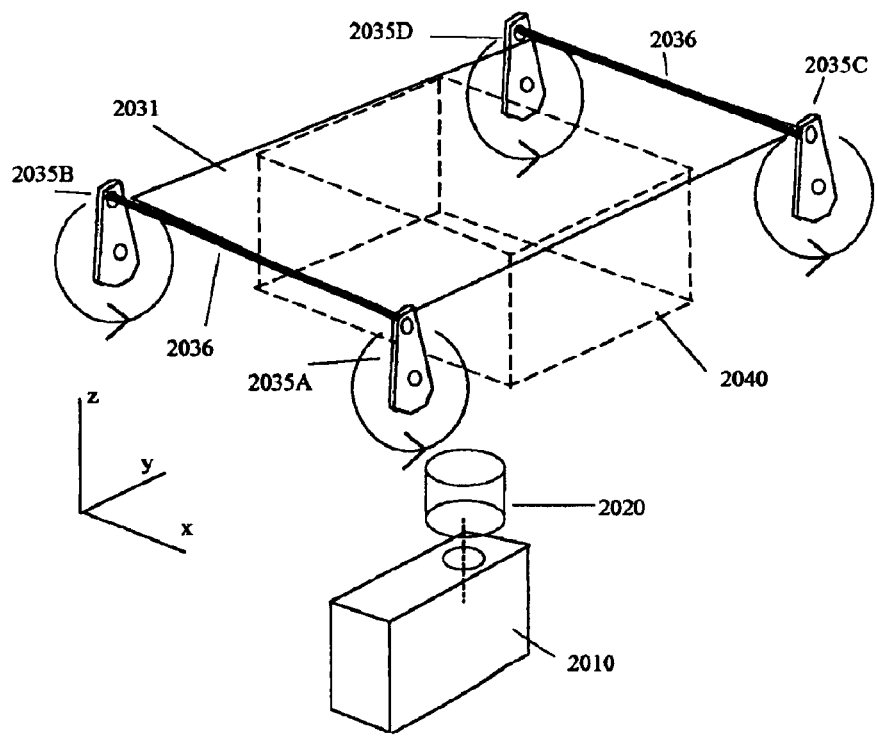
FIG. 20 illustrates the fourth preferred volumetric display apparatus according to the invention.

[Tsao] also disclosed several volumetric display systems based on a reciprocating screen. FIG. 20 illustrates an improved reciprocating screen system which uses a smooth rotational mechanism to create the reciprocating screen motion. The core mechanism has two pairs of rotary arms 2035A–D rotating in unison. The rotary arms can be mounted on an integrated machine base (not shown) and powered by a motor with a timing belt system (not shown). A translucent screen 2031 is attached at its both ends to two rods 2036, which are mounted to the two pairs of rotary arms with rotary bearings. As the arms rotates, the screen moves accordingly and a display volume 2040 can be created by the screen sweeping. Because the four rotary arms rotate in unison, there is basically no stress imposed upon the screen and rod assembly daring the rotation. The screen and the rods can therefore be made of lightweight materials. Each rotary arm can be balanced with a proper weight distribution. As a result, the rotation can be smooth and well balanced. The image projection system 2010 projects image frames through an optical interfacing mechanism 2020 onto the screens. The optical interfacing mechanism is one of the mechanisms disclosed in [Tsao], which can be synchronized to the screen motion, through an actuator-sensor system. In this improved reciprocating screen system, the nature of motion of the screen is in fact rotational. In the general sense, the screen rotates about an axis and always keeps its surface facing a fixed direction. In terms of FIG. 20, the screen 2031 rotates about an axis, which is parallel to the x-axis of the coordinate system, and keeps its surface always facing the z-direction. The major advantage of this motion mode is creating reciprocating screen sweep by rotating mechanism. Mechanically, this rotating mechanism is simple and reliable when compared to other reciprocating mechanisms such as using slider and crankshaft. Due to the nature of the motion, the length of the screen must be larger than the length of the display space 2040, in order to capture the projection beam at all time, as illustrated in FIG. 20.

Figure 21:
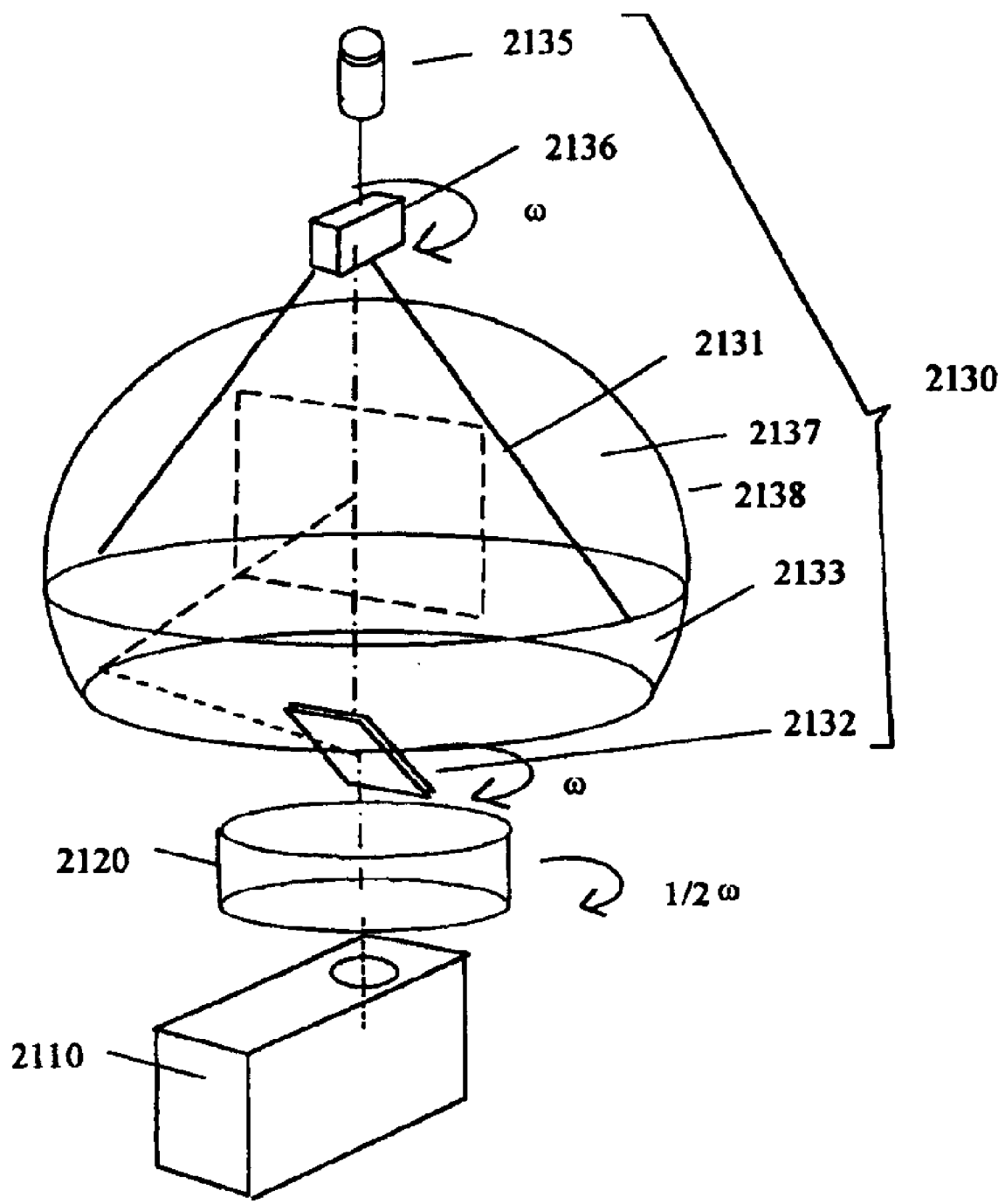
FIG. 21 illustrates the fifth preferred volumetric display apparatus according to the invention.
Figure 22:
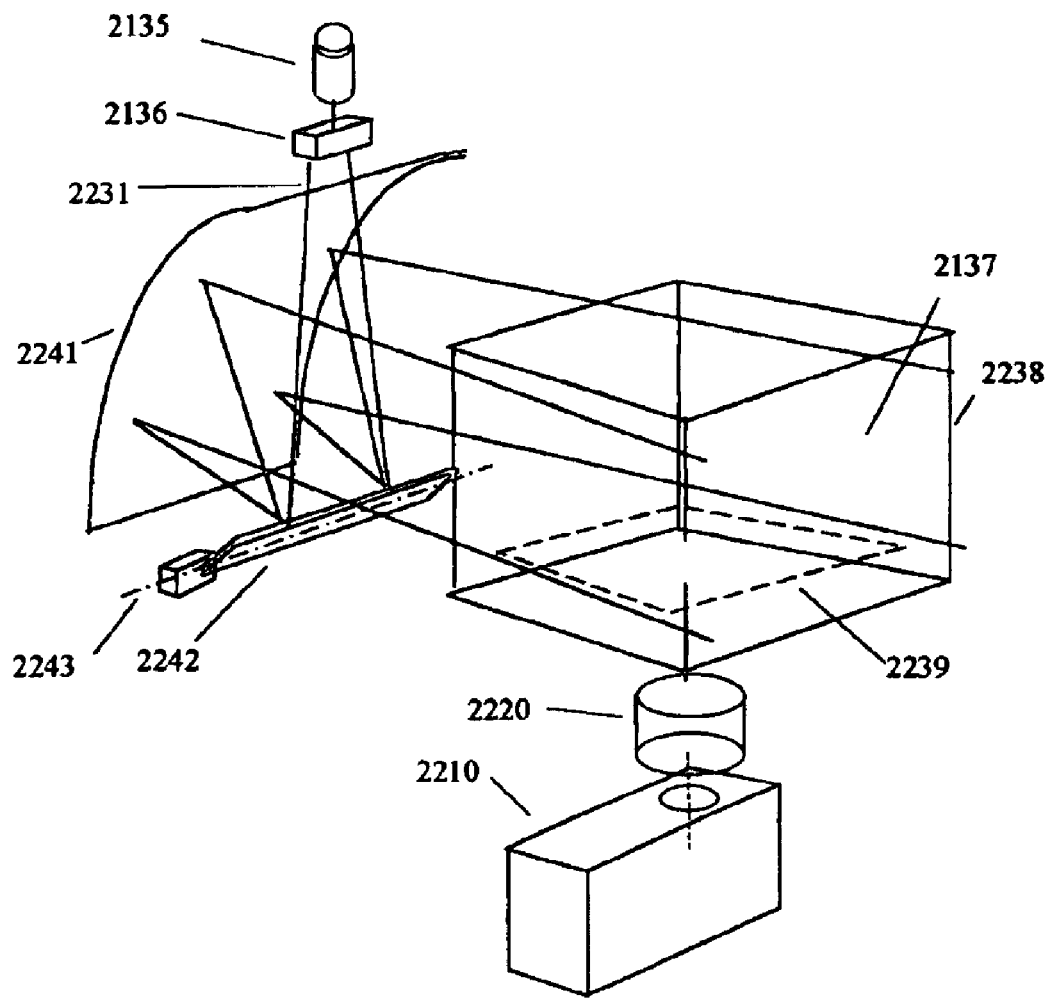
FIG. 22 illustrates the sixth preferred volumetric display apparatus according to the invention.

Still another preferred embodiment of volume display system combines the two-stage excitation approach with the optical interfacing mechanism. The basic concept is to replace the physical screen with a planar light beam (the first stage excitation) in a photoluminescent material and project a whole frame of image to the planar light beam (the second stage excitation). FIG. 21 illustrates a rotating approach. A planar beam 2131 is created by a laser 2135 of a first frequency and a planar beam converter 2136, which can either be a set of cylindrical lens or diffractive optics. By rotating the planar beam converter, the planar beam sweeps the photoluminescent material enclosed in a dome shaped container 2138. The image projection system 2110 projects image frames of a second frequency to intersect the planar beam, a whole frame at a time. The planar beam converter and the center reflector 2132 rotate in synchronization and the optical interfacing mechanism 2120 rotates at half their speed. To further reduce the number of rotating parts, the rotating side reflector in FIG. 13 can be replaced by a band of reflective coating 2133 around the interior of the dome. Since this reflective band is spherical, not flat, a correction lens or mirror must be added to the projection light path (not shown). FIG. 22 illustrates a reciprocating approach. A planar beam 2231 is again created by a laser and a planar beam converter. There can be many ways to create parallel scan planes 2239 in the container of photoluminescent material. One example is using a parabolic reflector 2241 and a scanning mirror 2242 at its focal line 2243, as shown in figure. The image projection system 2210 projects image frame of light of a second frequency. The optical interfacing mechanism 2220 is the one disclosed in [Tsao], which can be synchronized to the motion of the scanning mirror through an actuator-sensor system.

Figure 23:
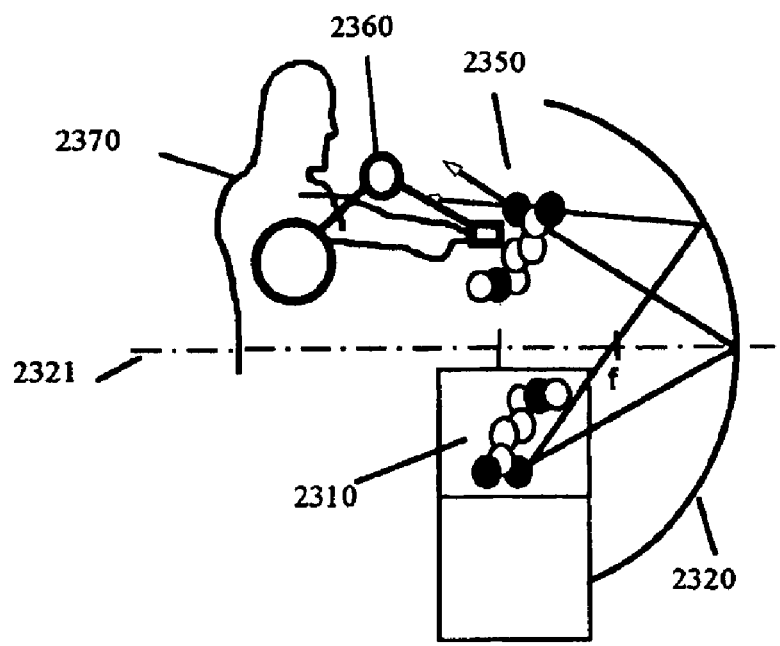
FIG. 23 illustrates the seventh preferred volumetric display apparatus according to the invention.

The volumetric 3D display systems can further be modified to provide a better human systems interface. One desirable feature is to allow the user to "reach into" the 3D data image to perform desired data handling or manipulation. FIG. 23 illustrates one preferred embodiment of such a "barrier free" display system, which combines a volumetric display 2310 with a concave mirror 2320. The display volume of the volumetric display system is placed at a location near the optical axis of a concave reflector 2321. By principle of optics, the volumetric images displayed in the display volume can be projected as real images floating in mid air 2350 near the optical axis of the concave reflector, as shown in the figure. The image is 3D and appears popping outside of the reflector. This system is hereby called "volumetric image projector". A 3D input device 2360, such as a position tracking system, a 3D coordinate measurement arm, or a haptic interface, can be integrated with the system to allow the user 2370 interact directly with the 3D images.

Figure 24:
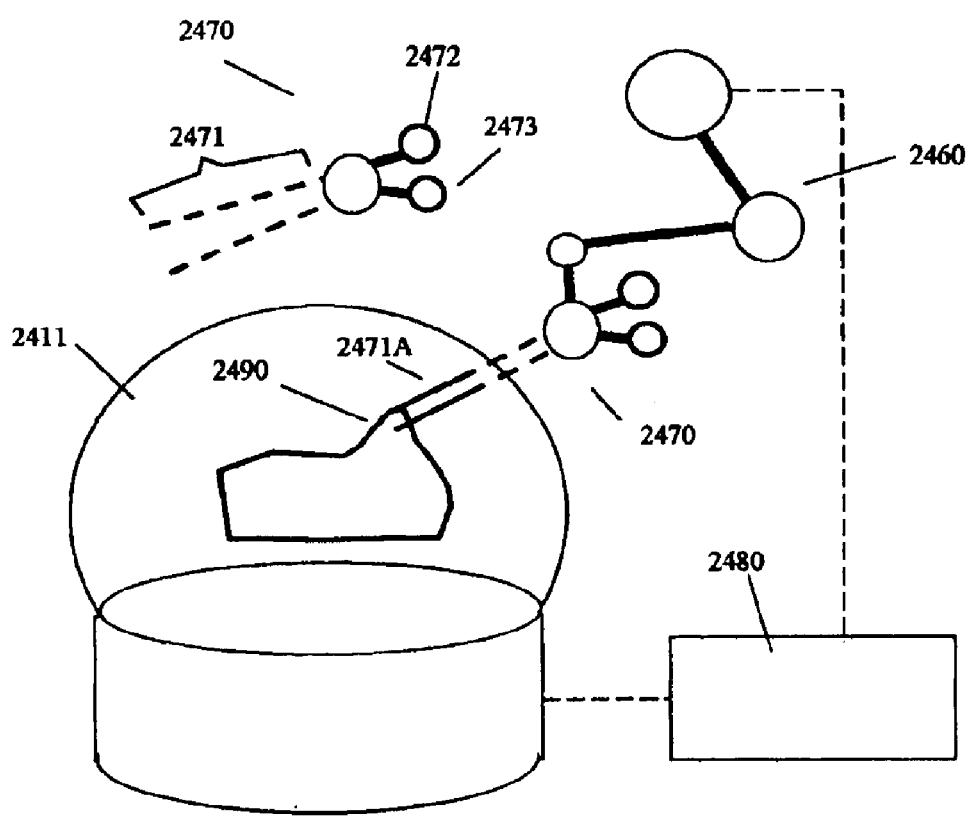
FIG. 24 illustrates the eighth preferred volumetric display apparatus according to the invention.

Another embodiment of the "barrier free" volumetric display system uses a "virtual manipulator" to allow the user interact with the images directly. Instead of reaching the arm or fingers into the display space directly, the user uses a manipulating device 2470 outside the display volume 2411, as shown in FIG. 24. The manipulating device, however, has a "virtual end" 2471 that is defined only in the form of image data, not in physical form. A position tracking system 2460 tracks the 3D position and orientation of the manipulating device and therefore the position and orientation of the "virtual end" is always known to the computer 2480 that controls the system. When the computer detects any part of the "virtual end" moving into the display volume 2411, a volumetric 3D image 2471A of that part of the virtual end will be displayed in the display volume at the corresponding location and orientation. As a result, the user can use the manipulating device as if he or she has a tool that can reach directly into the 3D images. It should be noted that this "virtual manipulator" concept is different from the existing 3D input systems such as a 3D mouse. The operation of a 3D mouse relies on relative hand-eyes coordination, because the position mapping between the 3D mouse and the image is relative. The "virtual manipulator" operation uses absolute mapping of position and orientation between the manipulating device 2470 and its virtual end and therefore allows direct hand-eyes coordination. In the general sense, the virtual manipulator is a user interface that bridges the world inside the display volume and the outside world. Since in general one can not reach a physical object into the display volume of a volumetric 3D display, the virtual manipulator has its two portions serving the two different worlds. The virtual end can move about and perform manipulation in the display volume while the physical end can be held by hands and move about outside. And most important, the connection (i.e. spatial relation) between the virtual end and the physical end is a fixed, absolute spatial connection. As a result, a user can hold the physical end and then move the virtual end in the display volume as if the virtual end is a physical extension attached to the actual physical end. Because of this and because volumetric 3D images actually occupy space in the display volume, user can point to and manipulate volumetric 3D images as if these images are physical objects. In contrast, because 3D images displayed in perspective view on conventional 2D display do not actually occupy space, the concept of virtual manipulator does not apply well. Haptic interface such as force-feedback systems can be integrated with this system to create "virtual tools". For example, as illustrated in FIG. 24, the manipulating device is a virtual tweezers with two force-feedback actuation points 2472 and 2473. The user can use two fingers to hold the two action points and applies force. The "virtual end" 2471 can be defined as two tips of the tweezers, which move as the user manipulates the two actuation points. With a suitable computer programming and control, the user can then use the virtual tweezers to "pick up" a tissue surface 2490, with both the tweezers tips and the tissue in the form of volumetric 3D images in the display volume. The "virtual manipulator" concept can, of course, also be used in the "volumetric image projector".

This current invention also includes creating volumetric color images using film-based displays. The display panels in many preferred embodiments of image projection systems can be replaced by a film projector. The "color sub-surface method" and "subframe method" can also be extended to film-based image sources. The film based systems should include films for creating light patterns of both visible and non-visible light.

In addition to the preferred embodiments discussed above, many other volumetric display systems, such as those discussed in the section BACKGROUND OF THE INVENTION, can also be used with this current invention. It should also be noted that many methods of the current invention are not limited to volumetric displays based on projection systems. For examples, the method of "color sub-surfaces" and the "sub-frame method" can both be applied to volumetric displays based on rotating LEDs or based on multiple layers of LCDs.

It should be further noted that the term "color" used in the current invention generally includes both color and gray scale representation. It should also be noted that the term "color triads" generally includes various layout arrangements of pixels of different color frequencies, including color stripes or matrix or other arrangements. The techniques used to create those color triads include those using color filters, in the form of triads or stripes or other forms, and those requiring no color filters, such as spatio-chromatic colored illumination techniques using diffractive optics or holographic elements. In addition, the term "display panel" generally includes various types of image sources capable of producing a 2D image pattern, including SLMs (spatial light modulators), matrix of lasers, LEDs, CRTs, and others. It should also be noted that although "three primary colors" and "three panels" are used to describe the general concept of color combination, any two colors of significantly different frequencies is enough to perform color combination to create variations of colors, if not full-color.

REFERNCES

Batchko, R. G. "Rotating Flat Screen Fully Addressable Volumne Display System", U.S. Pat. No. 5,148,310, 1992

Belfatto, R. V. et al. "Commercialization of a Fully Illuminated Volumetric Display", presented at the Conference of the International Society for Optical Engineering, Jan. 24–30, 1998, San Jose, Calif.

Berlin, E. P. "Three Dimensional Display", U.S. Pat. No. 4,160,973

Blundell, B. G. "Three dimensional display system", U.S. Pat. No. 5,703,606

Displaytech, Product catalog of Displaytech Inc. of Longmont, Colo.

Downing, E. et al. "A ThreeColor, Solid-State, Three-dimensional Display", Science vol. 273, 30 August 1996, pp. 1185

Garcia, F. Jr., "Three Dimensional Color Display and System", U.S. Pat. No. 4,871,231

Garcia, F. Jr. and Williams, R. D., "Real Time Three Dimensional Display with Angled Rotating Screen and Method", U.S. Pat. No. 5,042,909

Hattori, T. et al. 1992 "Spatial Modulation Display using Spatial Light Modulators", Optical Engineering, vol. 31, No. 2 p. 350

Korevaar, E. J. "Three Dimensional Display Apparatus", U.S. Pat. No. 4,881,068, 1989

Lasher, M. et al., "Laser Projected 3D Volumetric Display", in *Projection Display II*, Ming H. Wu, Editor, Proc. SPIE 2650, pp. 285 (1996)

MacFarlane, D. "Volumetric Three-dimensional Display", Applied Optics, November 1994, v. 33, n. 31, p. 7453

Paek, E. G. et al. "A 3D Projection Display using PDLCs", presented at the Conference of the International Society for Optical Engineering, Jan. 29–Feb. 2, 1996, San Jose, Calif.

Rowe, W. G. "Three Dimensional Display Device", U.S. Pat. No. 4,063,233, 1977

Sadovnik, Lev. S. and Rizkin, A. "3-D volume visualization display", U.S. Pat. No. 5,764,317

Thompson, E. E. and DeMond, T. W. "Apparatus and Method for Image Projection", U.S. Pat. No. 5,506,597

Tsao, C. C., Zhou, Z. and Hu, A. K. J. "Method and Apparatus for Displaying Three-dimensional Volumetric Images", U.S. Pat. No. 5,754,147, 1998

Tsao, C. C. "Moving Screen Projection Technique for Volumetric Three-dimensional Display", U.S. Pat. No. 5,954,414, 1999

What is claimed is:

1. Method of displaying in actual 3D space a set of 3D data containing densely spaced data points, the method comprising the steps of:
   (1) determining in said set of 3D data a number of spatial regions, each said region being of a different property or of a different range of data value;
   (2) creating a number of surfaces or curves along the boundary of each said region, each said surface or curve enclosing and separating a said region;
   (3) creating a number of sets of scattered points of different spatial distribution density, each said set of scattered points corresponding to one of said regions;
   (4) collecting the data of said surfaces, said curves, and said scattered points into a set of viewable data;
   (5) displaying said viewable data in actual 3D space by using a volumetric 3D display.

2. Method of claim 1, wherein the steps of creating said viewable data further including assigning color or gray scale description to the data according to the color or gray scale of the original 3D data; and the step of displaying said viewable data comprising the steps of:
   (1) processing said viewable data into a displayable data; said displayable data having a number of subsets of data points, each subset being of a different predetermined color;
   (2) generating a set of separate image patterns according to said displayable data, each said separate image pattern being of a different predetermined color and comprising a series of image frames; and displaying the image frames of each separate image pattern in sequence and repeatedly on a color display system;
   (3) projecting and displaying the image frames from each separate image pattern in sequence at pre-determined positions in actual 3D space repeatedly and recombining said separate image patterns into volumetric 3D images with colors or gray scales.

3. Method of claim 2, wherein the recombination of separate image patterns including One of the following methods: exact combination, temporal combination, spatial combination, or spatial-temporal combination;
   said exact combination having each primary color component of each voxel in the recombined separate image patterns appear at the same location in the display space and in the same repeated display sequence,
   said spatial combination having each primary color component of each voxel in the recombined separate image patterns appear in slightly different locations in the display space but in the same repeated display sequence;
   said temporal combination having each primary color component of each voxel in the recombined separate image patterns appear in the same location in the display space but in different repeated display sequences,
   said spatial-temporal combination having each primary color component of each voxel in the recombined separate image patterns appear in slightly different locations in the display space and in different repeated display sequences.

4. Method of claim 2, wherein said color display system comprising one of the following color image display means:
   (1) at least one color-pixel display panel; said color-pixel display panel comprising an integrated 2D arrays of switchable color filters; or
   (2) two or more monochrome display panels; each illuminated with a different predetermined color; or
   (3) at least one plural color-triad display panel; or
   (4) at least one plural film based display.

5. Method of claim 2, wherein said color display system comprising at least one monochrome display panel; and the step of projecting and displaying the image frames in actual 3D space comprising the steps of:
   (1) sweeping a projection screen in said actual 3D space repeatedly, said projection screen carrying a pattern of color triads on the surface;
   (2) projecting the image frames onto the projection screen and aligning the image frames to the pattern of color triads to create color image frames.

6. Method of displaying a 3D surface of color or gray scale in actual 3D space, the method comprising the steps of:
   (1) creating a number of sub-surfaces corresponding to said 3D surface, each surface having a predetermined color and a 3D shape similar to said 3D surface;
   (2) displaying and closely stacking said sub-surfaces in the display space of a volumetric 3D display, the stacked sub-surfaces forming an integrated surface, said integrated surface having a surface thickness of a few voxels of said volumetric 3D display, said integrated surface recreating the shape of said 3D surface and recreating the colors or gray scale of said 3D surface by mixture of colors of all the stacked sub-surfaces.

7. Method of displaying color volumetric 3D images comprising the steps of:
   (1) generating a set of color image frames in sequence on a color display system, said color display system including one of the following color image display means:
      at least one color-pixel display panel; said color-pixel display panel comprising an integrated 2D arrays of switchable color filters; or
      two or more monochrome display panels; each illuminated with a different predetermined color; or
      at least one plural color-triad display panel; or
      at least one plural film based display;
   (2) separating each said color image frame into a number of sub-frames by a color switching means, each of said number of sub-frames having a different predetermined color and propagating separately in time domain in a fixed order;
   (3) projecting each of said color image frames in sequence and displaying the corresponding sub-frames of each of said color image frames according to said fixed order at different pre-determined locations in actual 3D space repeatedly.

8. Method of claim 7, wherein the color switching means comprising switchable color filters or color wheels, and the step of projecting including projection onto a moving screen.

9. Method of claim 7, further including the steps of:
   (1) generating at least one new set of color image frames in sequence;
   (2) separating each frame of the new set into a number of sub-frames, the number being the same as said number of sub-frames of each color image frame in the original set; each of the number of sub-frames having a different predetermined color and propagating separately in time domain but in a new order different from said fixed order in the original set;

(3) projecting each sub-frame from said new set of color image frames according to the new order and superimposing each sub-frame from the new set and the original set to form a set of superimposed image frames; each frame of the superimposed image frames containing a number of sub-frames, each of a different color and originated from a different set of color image frames;

(4) projecting and displaying the superimposed image frames at different pre-determined locations in actual 3D space repeatedly.

10. System for displaying volumetric 3D images comprising (1) an image projector;

(2) a rotating screen with a set of central and side reflectors rotating in unison with the screen;

(3) an optical interfacing mechanism rotating at half the speed of the screen, said optical interfacing mechanism comprising one of the following means:

a. a reflector assembly including at least one 90 degree reflector, said 90 degree reflector comprising two flat reflectors arranged at an angle of 90 degree with each other; or b. a reflector assembly including at least one 90 degree reflector, said 90 degree reflector comprising two flat reflectors arranged at an angle of 90 degree with each other; the reflector assembly further comprising at least one 4-reflector setup; said 4-reflector setup comprising: a first reflector receiving a projection beam from the image projector and reflecting the beam to the 90 degree reflector; a second and a third reflector together guiding the beam from the 90 degree reflector back to the original projection direction; or c. a reflector assembly comprising it least one 5-mirror setup; said 5-mirror setup comprising: a first mirror receiving a projection beam from the image projector and reflecting the beam away from the rotating axis to a second mirror; a third and a fourth mirror sending the beam back toward the rotating axis; a fifth mirror sending the beam back to the original projection direction; or d. a pair of orthogonal reflectors; or e. a set of cylindrical lens capable of projecting flipped images, said set of cylindrical lens being a past of the projection lens of the image projector.

11. System for displaying volumetric 3D images comprising (1) a projection screen revolving about an axis;

(2) at least one display panel and a set of projection optics; both the display panel and the projection optics rotating in unison with the screen; the display panel being capable of displaying a set of 2D image frames in sequence; the projection optics being capable of projecting images displayed on said display panel onto said projection screen when the display panel and the projection optics being properly illuminated;

(3) a stationary light source illuminating the display panel and the projection optics via an illumination path traveling along said axis;

(4) a plural slip-ring system for passing control signals and image signals to said display panel.

12. Method for displaying a set of 3D data in actual space comprising the steps of:

(1) processing said 3D data into data representing a set of 2D image frames, said 2D image frames recreating a volumetric 3D image of said 3D data when each frame being distributed to and displayed at a predetermined different location in actual space;

(2) rotating a display plane about an axis while keeping said display plane always facing a fixed direction, said display plane sweeping through actual 3D space and defining a display volume;

(3) displaying said 2D image frames in sequence on said display plane; each of the 2D image frames being distributed to and displayed at a predetermined different location in said display volume;

wherein said step of displaying said 2D image frames comprising the step of projecting said 2D image frames onto the relating display plane.

13. Method of claim 12, wherein the step of projecting further including the step of projecting the 2D image frames by way of an optical interfacing mechanism thereby keeping the size, orientation and focus of the 2D image frames invariant with respect to the display plane.

14. Method for displaying a set of 3D data in actual space comprising the steps of:

(1) processing said 3D data into data representing a set of 2D image frames, said 2D image frames recreating a volumetric 3D image of said 3D data when each frame being distributed to and displayed at a predetermined different location in actual space;

(2) providing a body of photoluminescent media with the property of two-step excitation;

(3) sweeping a planar light beam through said body of photoluminescent media periodically in rotating motion or in reciprocating motion; said planar light beam being of light of the first frequency corresponding to the two-step excitation property; said planar light beam intersecting said body of photoluminescent media and thereby forming a moving plane;

(4) projecting said 2D image frames by way of an optical interfacing mechanism onto said moving plane in sequence and thereby displaying each of said 2D image frames at a predetermined different location in said body of photoluminescent media; said 2D image frames being projected with a light of the second frequency corresponding to the two-step excitation property; said optical interfacing mechanism keeping the size, orientation and focus of said 2D image frames invariant with respect to said intersecting plane.

15. Method for interacting with a 3D image data in actual 3D space, comprising the steps of:

(1) displaying the 3D image in actual 3D space by using a plural volumetric 3D display; the volumetric 3D display being connected to a computer;

(2) providing a manipulating device; said manipulating device having a physical end and a virtual end, said physical end being able to be moved about outside the display volume of the volumetric 3D display, said virtual end being defined as an extension of the physical end in the form of coordinate data points in reference to said physical end; the relative position of each said coordinate data point with respect to any one point on said physical end being fixed;

(3) providing a plural position tracker for tracking the relative position and orientation of said physical end with respect to the volumetric 3D display; the position tracker being connected to said computer;

(4) computing the relative position of each data point defining the virtual end with respect to the volumetric 3D display according to the position and orientation of said physical end and according to the predefined spatial relation between said virtual end and said physical end;

(5) determining the portion of the virtual end that locates within the display volume of the volumetric 3D display, and determining the location and orientation of said portion of the virtual end inside the display volume, and then displaying the image of said portion of the virtual end in the display volume accordingly;

(6) providing a computer program for interaction between the virtual end image and the 3D image.

16. Method of claim 15, further including the step of forming real images of the 3D images in empty 3D space using a concave mirror, the step of operating the manipulating device in said empty space, and the step of displaying the virtual end of the manipulating device in the empty space.

17. Method of claim 6, wherein said 3D surface representing a boundary surface partitioning a volume of data points, or a cross-sectional surface of a volume of data points, or a surface of a solid body.

18. Method of claim 15, further including the step of operating a virtual tool mechanism; said virtual tool mechanism being defined as an attachment to said virtual end in the form of coordinate data; said physical end further including an actuation means for controlling said virtual tool mechanism; said actuation means being connected to the computer and to said computer program for interaction; said computer program for interaction further including routines for controlling said virtual tool mechanism via said actuation means, routines for interactions between said virtual tool mechanism and 3D image, and routines for displaying image of said virtual tool in the volumetric 3D display.

* * * * *

UNITED STATES PATENT AND TRADEMARK OFFICE
CERTIFICATE OF CORRECTION

PATENT NO.        : 6,765,566 B1
APPLICATION NO. : 09/218938
DATED             : July 20, 2004
INVENTOR(S)       : Tsao It is certified that error appears in the above-identified patent and that said Letters Patent is hereby corrected as shown below:

Drawings, sheet 8, Fig. 14, Fig. 15 and Fig. 16 are corrected and replaced by the following:

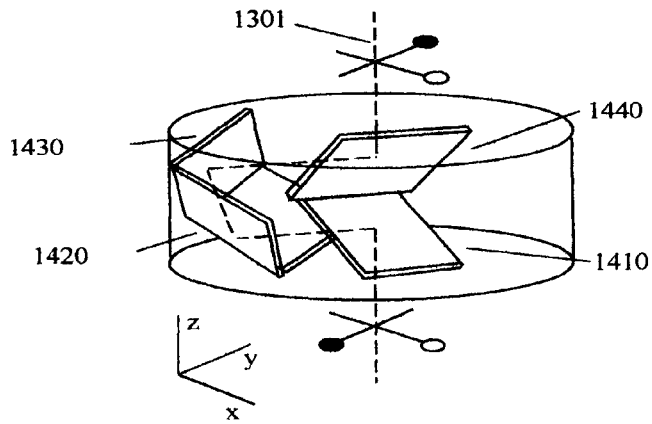

Fig. 14

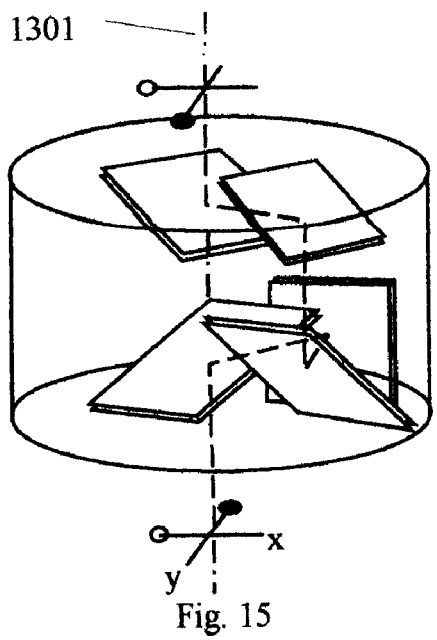

Fig. 15

UNITED STATES PATENT AND TRADEMARK OFFICE
CERTIFICATE OF CORRECTION

PATENT NO. : 6,765,566 B1  
APPLICATION NO. : 09/218938  
DATED : July 20, 2004  
INVENTOR(S) : Tsao It is certified that error appears in the above-identified patent and that said Letters Patent is hereby corrected as shown below:

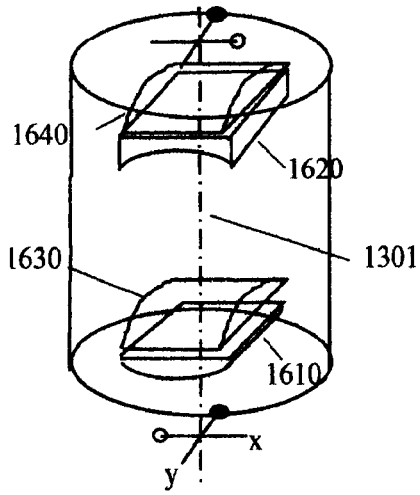

Fig. 16

| | |
|---|---|
| Col. 16, in claim 4, | line 3, delete "plural"; line 4, delete "plural". |
| Col. 16, in claim 7, | line 41, delete "plural"; line 42, delete "plural". |
| Col. 17, in claim 10, | line 45, change "past" into -- part --. |
| Col. 17, in claim 11, | line 61, delete "plural". |
| Col. 18, in claim 12, | line 14, change "relating" into -- rotating --. |

UNITED STATES PATENT AND TRADEMARK OFFICE
CERTIFICATE OF CORRECTION

PATENT NO. : 6,765,566 B1
APPLICATION NO. : 09/218938
DATED : July 20, 2004
INVENTOR(S) : Tsao It is certified that error appears in the above-identified patent and that said Letters Patent is hereby corrected as shown below:

Col. 18, in claim 15,  line 50, delete "plural"; line 61, delete "plural".

Signed and Sealed this

Tenth Day of October, 2006

JON W. DUDAS
*Director of the United States Patent and Trademark Office*